(12) United States Patent  
Sakamoto

(10) Patent No.: US 7,116,901 B2  
(45) Date of Patent: Oct. 3, 2006

(54) ZOOM FINDER DRIVE MECHANISMS

(75) Inventor: Takamasa Sakamoto, Osaka (JP)

(73) Assignees: Asia Optical Co., Inc., Taichung (TW); Optek Corporation, Osaka (JP)

( * ) Notice: Subject to any disclaimer, the term of this patent is extended or adjusted under 35 U.S.C. 154(b) by 171 days.

(21) Appl. No.: 11/015,533

(22) Filed: Dec. 17, 2004

(65) Prior Publication Data

US 2005/0254814 A1    Nov. 17, 2005

(30) Foreign Application Priority Data

May 14, 2004    (JP)    ............................. 2004-144649

(51) Int. Cl.  
*G03B 13/12*    (2006.01)

(52) U.S. Cl. ........................................ 396/84; 396/379

(58) Field of Classification Search .................. 396/84, 396/379  
See application file for complete search history.

(56) References Cited

U.S. PATENT DOCUMENTS

| | | | |
|---|---|---|---|
| 5,325,140 A * | 6/1994 | Torikoshi et al. | 396/84 |
| 5,424,793 A * | 6/1995 | Fukushima et al. | 396/83 |
| 6,381,412 B1 * | 4/2002 | Ishito et al. | 396/60 |
| 6,973,261 B1 * | 12/2005 | Nagae | 396/84 |
| 7,039,311 B1 * | 5/2006 | Nomura | 396/379 |
| 2004/0042092 A1 | 3/2004 | Normura | 359/819 |

* cited by examiner

*Primary Examiner*—W. B. Perkey  
(74) *Attorney, Agent, or Firm*—Thomas, Kayden, Horstemeyer & Risley

(57) ABSTRACT

A zoom finder drive mechanism, driven only when taking a picture. When a lens barrel is in a collapsed position, the cam-follower pin of a rotary barrel does not abut at an end of a protrusion of a finder cam barrel such that a first and second movable finder lenses are idle. When taking a picture, the cam-follower of the rotary barrel is abutted at the end of the protrusion of the finder cam barrel such that the first and second movable finder lenses are driven.

4 Claims, 29 Drawing Sheets

ZOOM FINDER DRIVE MECHANISMS

BACKGROUND

The invention relates to zoom finder drive mechanisms, and in particular to zoom finder drive mechanisms driven by movement of a zoom lens barrel.

Operations of a zoom finder in a camera are performed and moved by an optical photography system. In a conventional driving method for a zoom finder, rotary lens barrel driving elements are used as a direct driving source. A zoom motor driving the zoom lens barrel and speed-reduction gears thereof are also used as direct driving sources.

U.S. publication No. 2004-0042092 discloses a method for driving zoom finders. When a lens barrel is retracted or housed therein, the zoom finder is idle. When taking a picture, only the lens rotary elements in the zoom region and the zoom finder are connected by gears.

The zoom finder, driven in the zoom region when taking a picture, can reduce the moving stroke of the driving elements or prevent occurrence of needless loading in a region other than the zoom region. In U.S. publication No. 2004-0042092, however, since the lens rotary elements in the zoom region and the zoom finder are connected by gears, the gears are necessary components, increasing complexity and reducing available space therein. Thus, costs are increased.

SUMMARY

A simplified zoom finder drive mechanism is provided. The zoom finder drive mechanism, driven by movement of a zoom lens barrel, comprises a fixing barrel, a rotary barrel, a finder cam barrel, and a finder lens drive member. The fixing barrel comprises at least one first cam groove, formed on an inner circumference thereof and having a bottom surface defined thereon, and a hole formed on an outer circumference thereof and connecting to a part of the first cam groove via the bottom surface of the first cam groove. The rotary barrel comprises at least one first cam-follower formed on an outer circumference thereof and engaged with the first cam grooves of the fixing barrel. The rotary barrel rotates about a central axis parallel to an optical axis of an optical photography system. The finder cam barrel, disposed on the outer circumference of the fixing barrel, a second cam groove formed on an outer circumference thereof, and rotating by contacting the first cam-follower of the rotary barrel via the hole of the fixing barrel. The finder cam barrel comprises a second cam-follower engaged with the second cam groove so as to drive at least a portion of a finder lens group.

As the optical photography system is collapsed in a collapsed position when no photograph can be taken, the finder cam barrel does not contact the first cam-follower of the rotary barrel. As the optical photography system is extended from a collapsed position so as to perform a zoom operation, the finder cam barrel contacts the first cam-follower of the rotary barrel via the hole of the fixing barrel.

The finder cam barrel further comprises an enable means, contacting the first cam-follower when the rotary barrel rotates in the fixing barrel.

The enable means is a protrusion inserting in the hole of the fixing barrel.

After the optical photography system is moved from a housed position and driven in a photographing position, a zoom operation is performed. The cam-follower element of the rotary barrel and the finder cam barrel are not connected in the housed position. The cam-follower element of the rotary barrel and the finder cam barrel are connected in a zoom photographing region.

The finder cam barrel is driven by the cam-follower elements of the rotary barrel, and the finder drive mechanism is driven by the finder cam barrel. Thus, the structure is simplified, eliminating unnecessary elements and reducing costs.

Moreover, since the finder drive mechanism is only driven in a necessary zoom region, the movement stroke of the finder cam barrel can be reduced without needless loading in regions other than the zoom region.

Additionally, the finder cam barrel and the cam-follower elements of the rotary barrel can be connected to stabilize the finder cam barrel.

DESCRIPTION OF THE DRAWINGS

The invention can be more fully understood by reading the subsequent detailed description in conjunction with the examples and references made to the accompanying drawings, wherein.

DETAILED DESCRIPTION

FIGS. 1 to 29 are schematic views of an embodiment of a lens barrel and a zoom finder drive mechanism. The embodiment is applicable in a zoom lens barrel of a digital camera.

Figure 1:
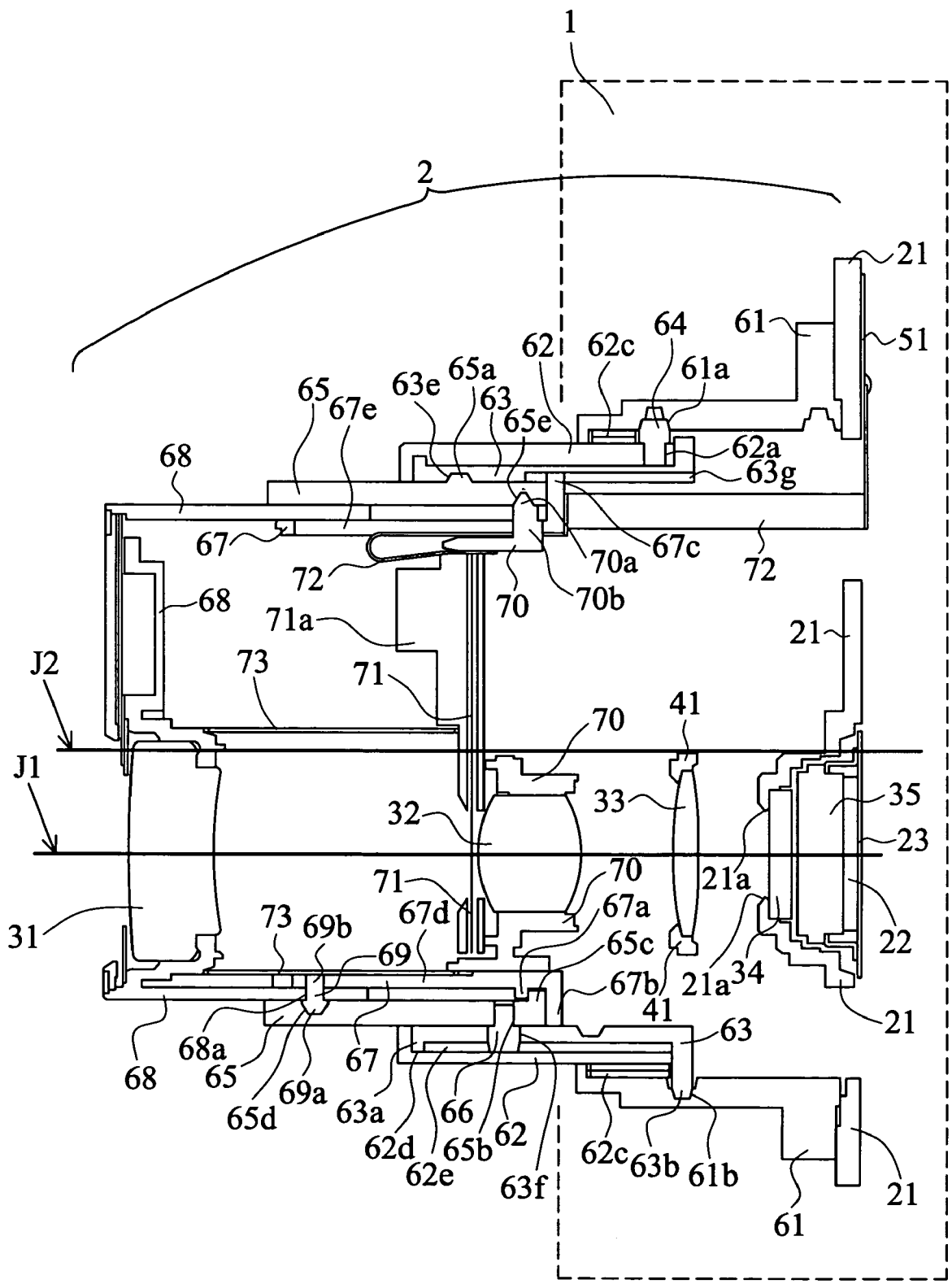
FIG. 1 is a cross section of an embodiment of a lens barrel in a full zoom.

FIG. 1 is a cross section of an embodiment of a lens barrel 2 in a full zoom of a photographing position. An optical photography system comprises a first lens group 31, a second lens group 32, a third lens group 33, a low-pass filer 34, and a charge-coupled device (CCD) 35, arranged in order from a photographic subject. An optical axis of the optical photography system is defined as J1, parallel to a central axis J2 of the lens barrel, and the optical axis J1 is eccentric from the central axis J2. Zooming is performed by moving the first lens group 31 and the second lens group 32 in a direction of the optical axis J1, respectively. Focusing is performed by moving the third lens group 33 in the direction of the optical axis J1. A light from the photographic subject side passing through the first lens group 31, the second lens group 32, and the third lens group 33 passes through the low-pass filter 34 and is guided to the CCD 35. Note that the term "optical axial direction" used in the following is particularly defined as directions parallel to the optical axis J1.

The fixing barrel 61 is fixed on a body 1. A CCD holder 21 located behind the fixing barrel 61 covers an opening of the fixing barrel 61. The low-pass filter 34 is attached to and supported by the CCD holder 21 at a front opening 21a. The CCD 35 and a heat sink 22 are integrally connected. The CCD 35 is fixed on the CCD holder 21 via the heat sink 22. A CCD flexible printed circuit board (FPC) 23 for transmitting electronic signals produced by the CCD is disposed behind the heat sink 22.

Figure 2:
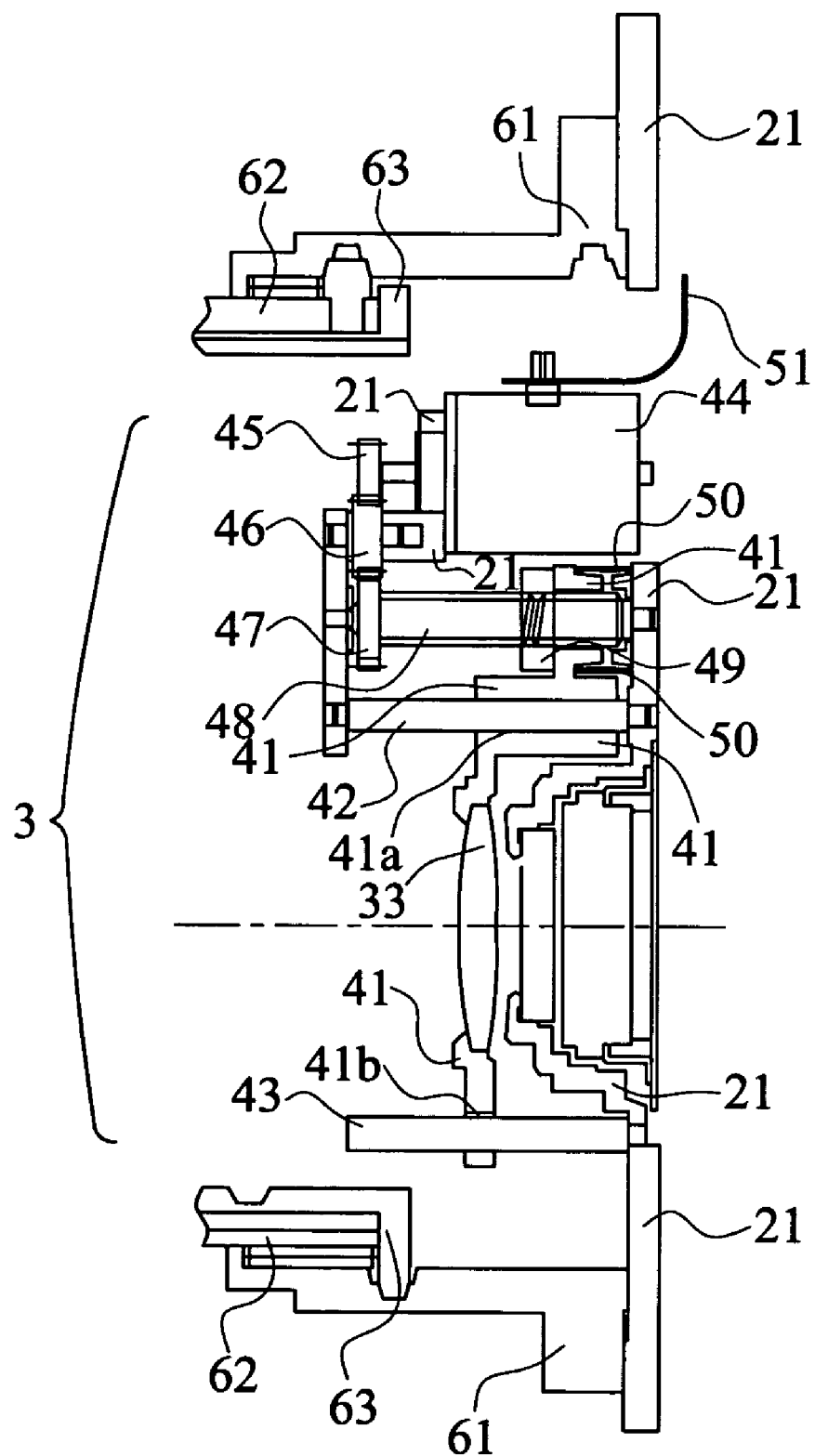
FIG. 2 is a cross section of a lens barrel of a focus drive mechanism.

The third lens group 33 for focus and a focus drive mechanism 3 for driving the third lens group 33 are correspondingly disposed near the CCD holder 21. FIG. 2 is a cross section of a lens barrel of a focus drive mechanism 3. A third lens frame 41 supporting the third lens group 33 is slidably disposed on a pair of guide shafts A42 and A43 of the CCD holder 21 in the optical axial direction. The guide shaft A42 is a main shaft of the third lens frame 41, and the guide shaft B43 is used for rotational control of the third lens frame 41. The guide shafts A42 and A43 can be slidably inserted into guiding holes 41a and 41b formed on the third lens frame 41.

Focus motor 44 is fixed in the inner side of the fixing barrel 61 corresponding to the third lens group 33 and the CCD holder 21 at a side of the CCD 35. The rotational driving force of the focus motor 44 is transferred to feed screws 48 from the focus motor gear 45 via the focus gears 46 and 47. The feed screws 48 and nuts 49 are engaged to allow back and forth movement of the third lens frame 41 along the optical axis. The rotational driving force of the focus motor 44 can be reduced by focus gears 46 and 47 such that the feed screws 48 have sufficient rotational torque. The third lens frame 41 is biased by the spring 50 thereof. The focus motor 44 is controlled by camera control circuit via the FPC 51 for driving the lens disposed behind the CCD holder 21.

Figure 3:
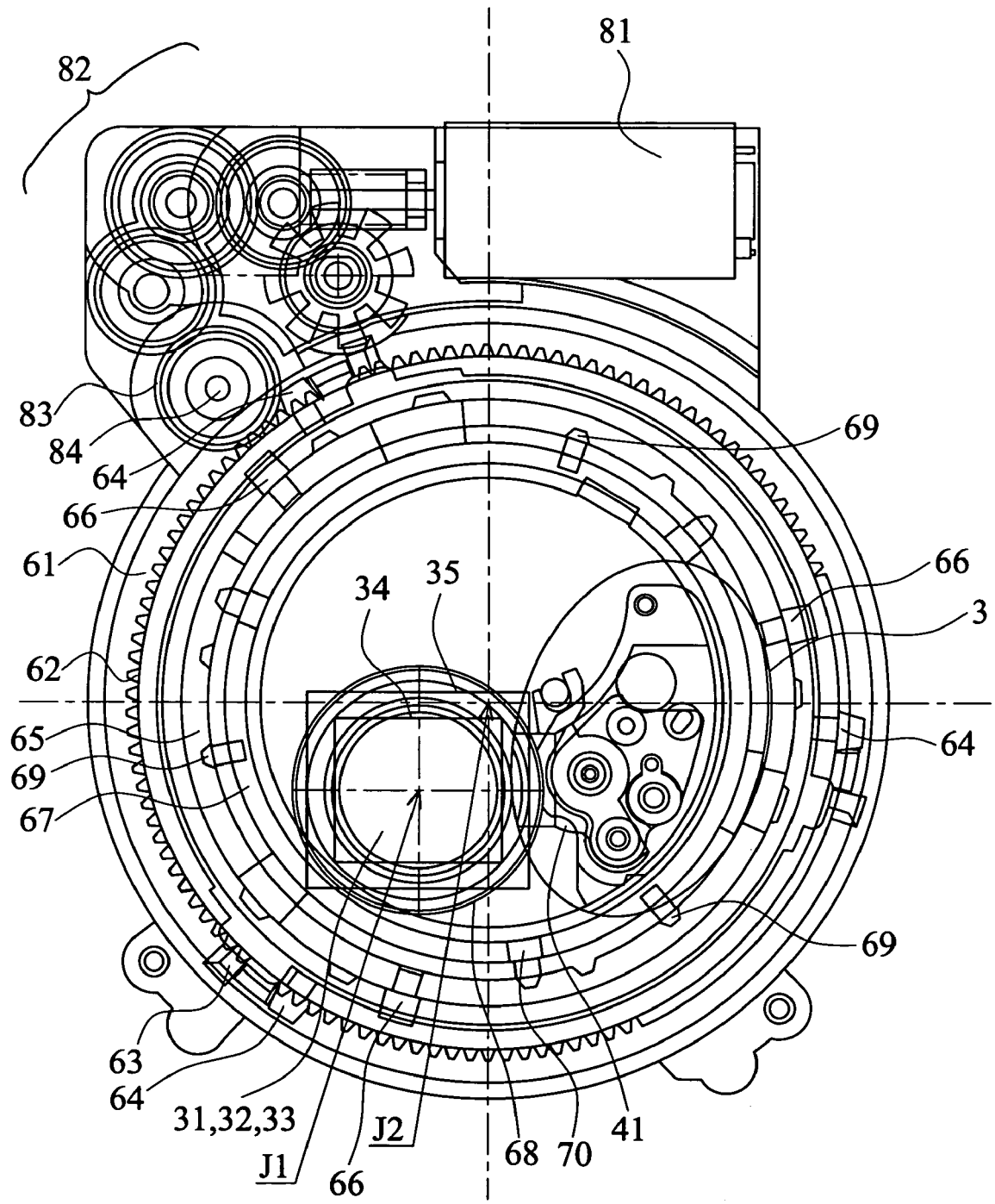
FIG. 3 is a front perspective view of a lens barrel in a photographing position.

FIG. 3 is a front perspective view of a lens barrel 2 in a photographing position. The upper portion of the fixing barrel 61 is disposed with zoom motor 81 and speed-reduction gear set 82. The driving force of the zoom motor 81 is transferred to the zoom gear 83 via the speed-reduction gear 82. The zoom gear 83 is rotatably supported with respect to the fixing barrel 61 by the gear shaft 84 parallel to the optical axial direction. The zoom motor 81, the speed-reduction gear 82, and the zoom gear 83 constitute a pulling mechanism of the drive mechanism. The zoom motor 81 is controlled by camera control circuit via the FPC 51 located behind the CCD holder 21.

Figure 4:
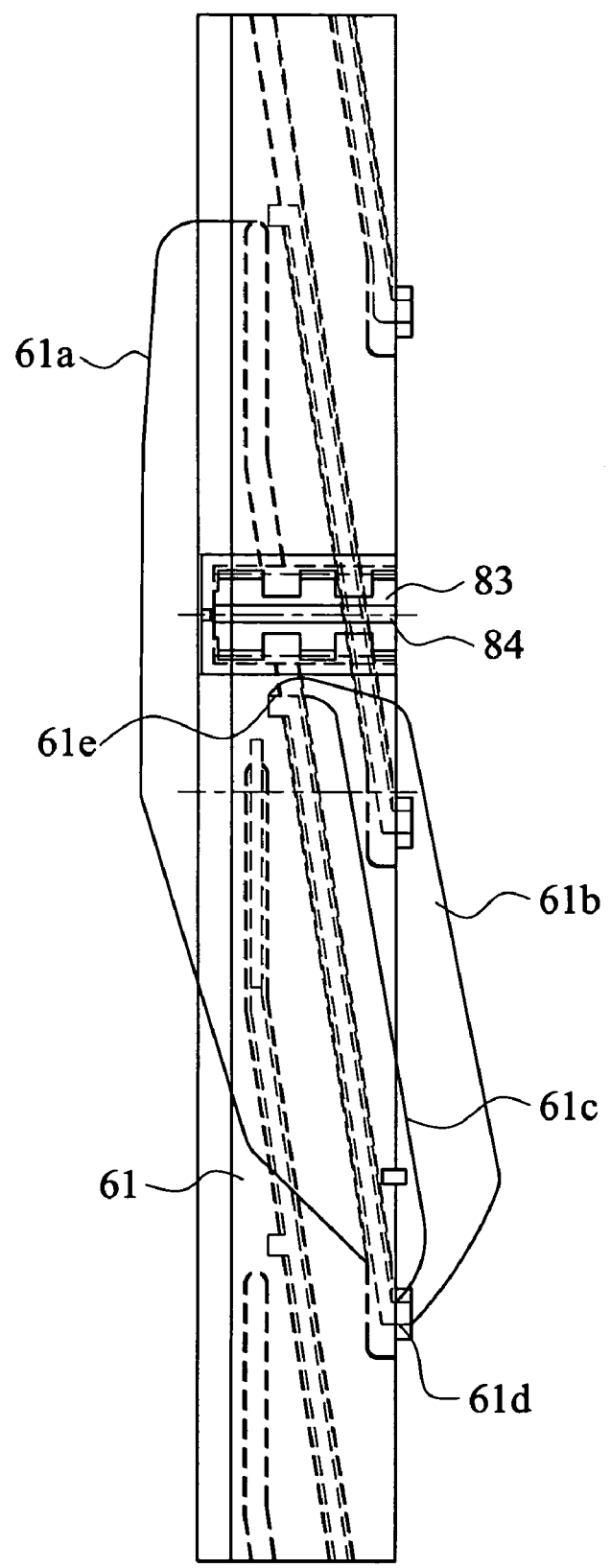
FIG. 4 is a development viewed from an outer circumference of a fixing barrel.
Figure 5:
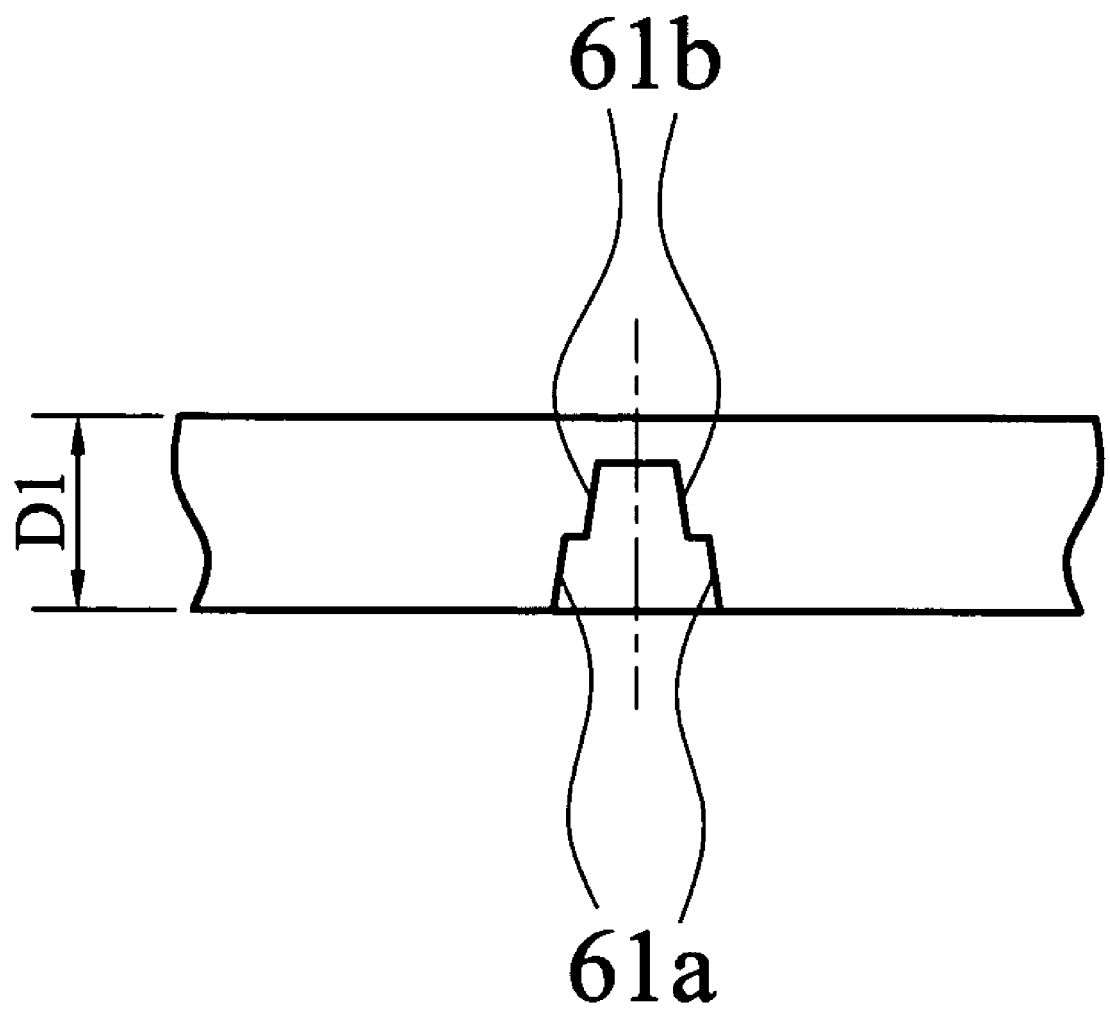
FIG. 5 is a cross section of a cam groove of the fixing barrel.

FIG. 4 is a development viewed from an outer circumference of a fixing barrel 61. Three cam grooves 61a for guiding the rotary barrel 62 and three cam grooves 61b for guiding the control barrel 63 are formed on the inner circumference of the fixing barrel 61. The cam grooves 61b of the control barrel 63 are deeper than the cam grooves 61a of the rotary barrel 62. The cam grooves 61a and 61b have the same grooved trace region 61c. The region 61c is divided into two sections, as shown in FIG. 5.

Figure 6:
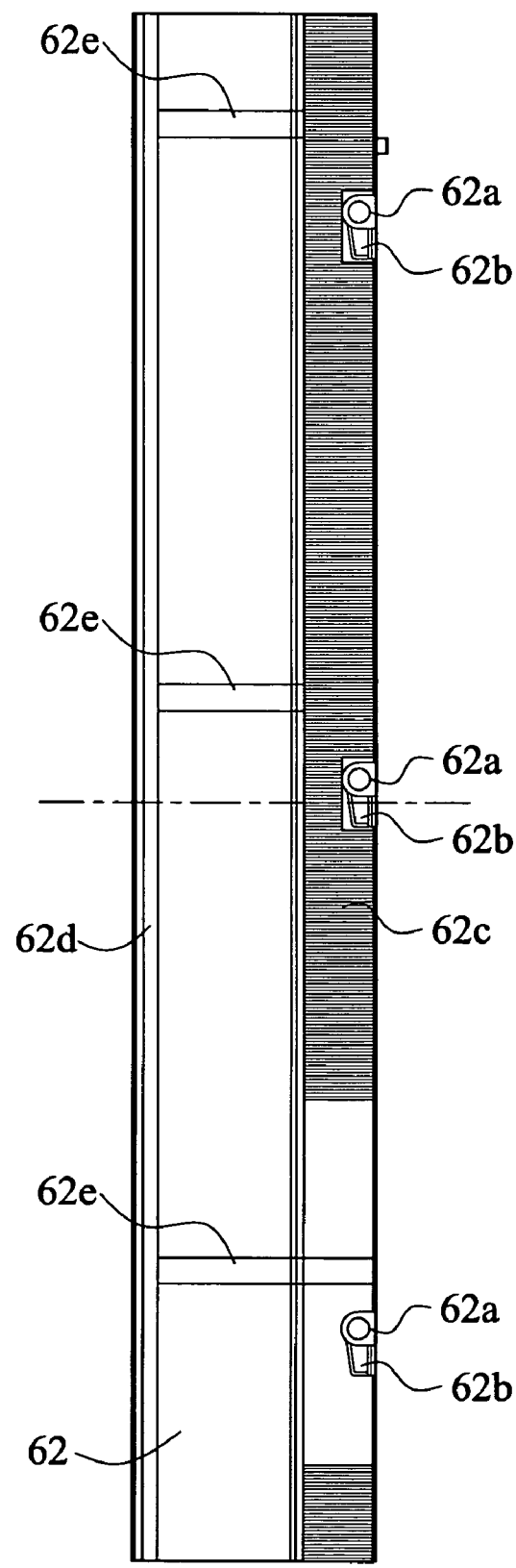
FIG. 6 is a development viewed from an outer circumference of a rotary barrel.

FIG. 6 is a development viewed from an outer circumference of a rotary barrel 62. The rotary barrel 62 is disposed on the inner circumference of the fixing barrel 61. Three rotary barrel cam-followers 64 are inserted into the holes 62a of the rotary barrel 62 to engage with the cam groove 61a of the fixing barrel 61. A protrusion 62b engaged with the cam groove 61a of the fixing barrel 61 is formed in the vicinity of the inserting position of the three rotary barrel cam-followers 64 on the outer circumference of the rotary barrel 62. The protrusion is an enable means, contacting the cam-follower when the rotary barrel 64 rotates in the fixing barrel 61. The function of the protrusion 62b is discussed hereinafter. The outer circumference of the rotary barrel 62 comprises a gear portion 62c meshed with the zoom gear 83. The zoom motor 81, speed-reduction gear 82, zoom gear 83 constitute a drive mechanism for generating rotational driving force. The rotary barrel 62 rotates about the central axis J2 such that the rotary barrel 62 extends or retracts along the cam groove 61a of the fixing barrel 61.

Figure 7:
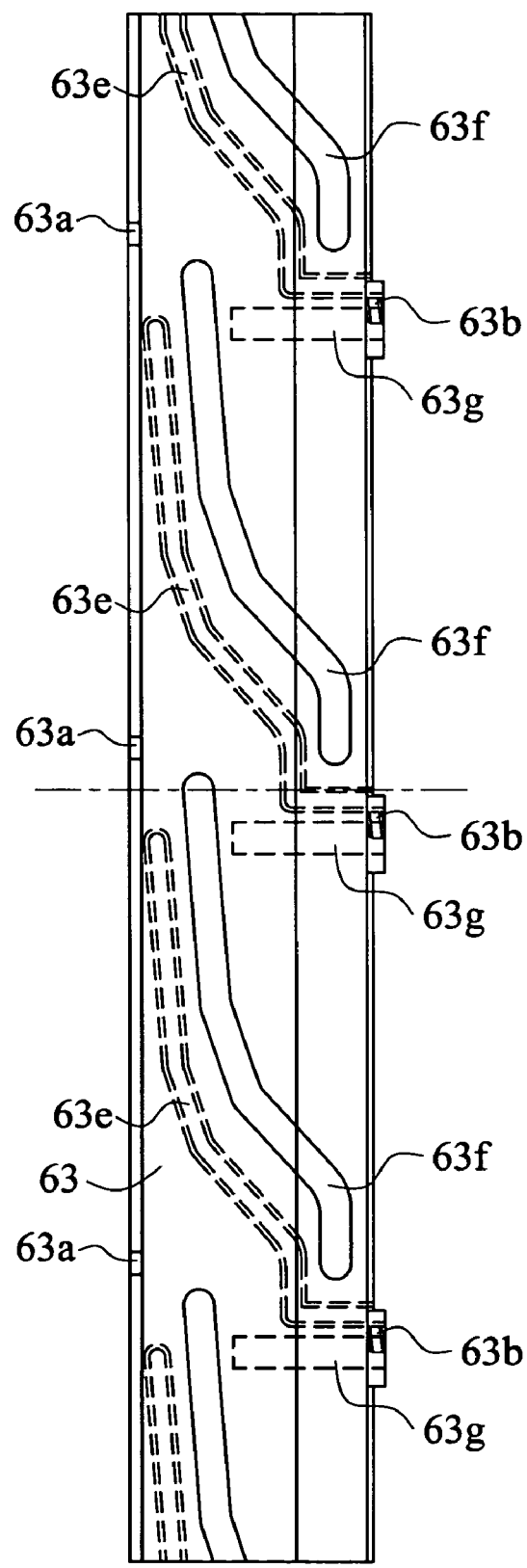
FIG. 7 is a development viewed from an outer circumference of a control barrel.
Figure 8:
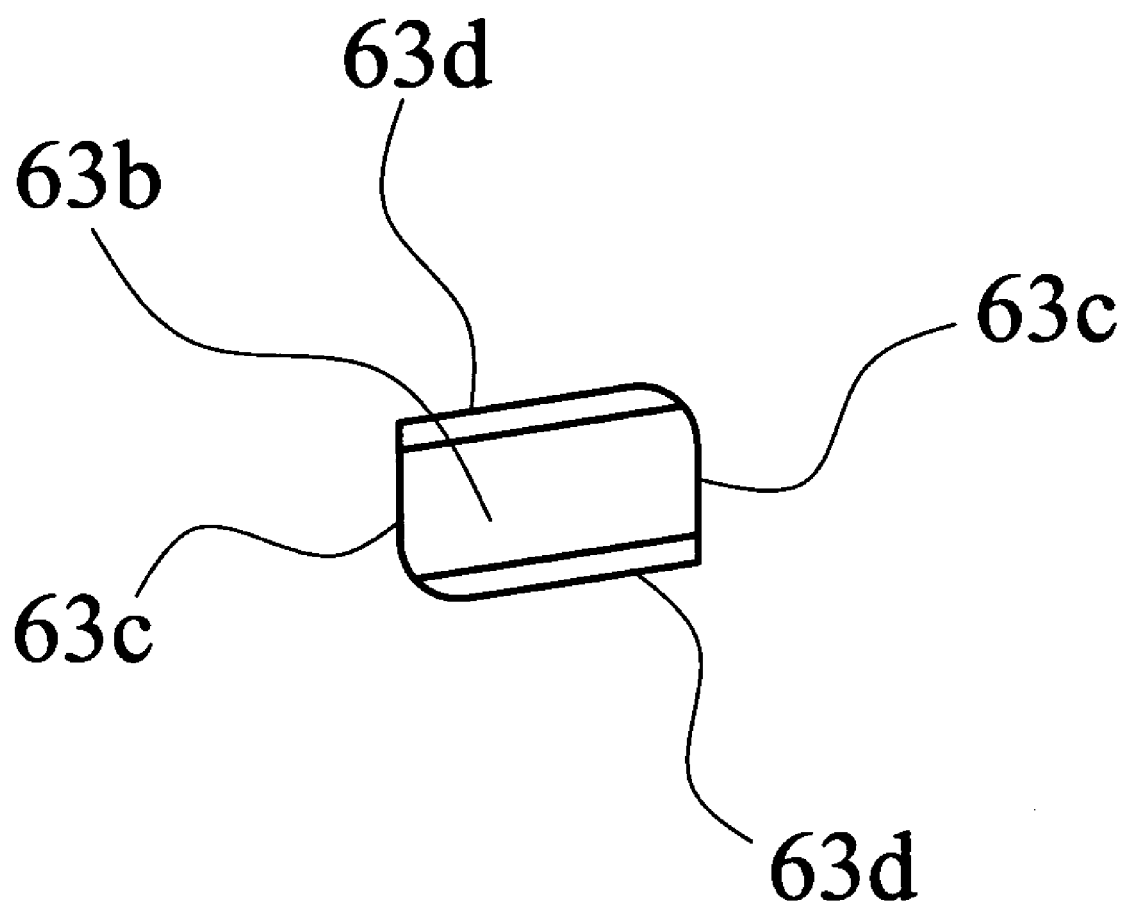
FIG. 8 is a cross section of a cam-follower of a control barrel.

FIG. 7 is a development viewed from an outer circumference of a control barrel 63. The control barrel 63 is disposed on the inner circumference of the rotary barrel 62. A hook 63a formed on the outer circumference of the control barrel 63 is engaged with a groove 62d on the inner circumference of the rotary barrel 62. The hook 63a corresponding to the rotary barrel 62 is moved and controlled in the optical axial direction and mutually rotatably supported. Three cam-followers 63b formed on the outer circumference of the control barrel 63 are engaged with the cam grooves 61b of the fixing barrel 61. A cam-follower 63b of the control barrel 63 has a parallelogram cross section, as shown in FIG. 8. The cam groove 61b of the fixing barrel 61 has a straight region 61d and 61e engaged with a plane 63c of the cam-follower 63b. The cam groove 61b of the fixing barrel 61 has a sloped region engaged with the plane 63d of the cam-follower 63b.

Figure 9:
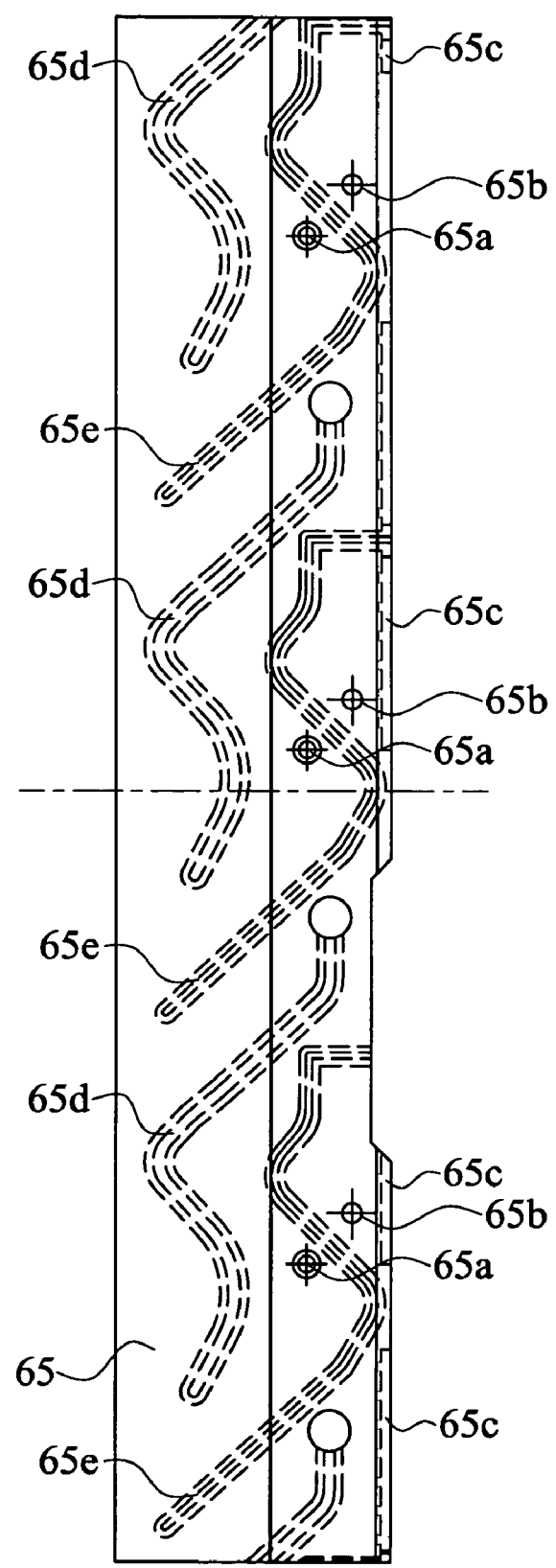
FIG. 9 is a development viewed from an outer circumference of a cam barrel.

FIG. 9 is a development viewed from an outer circumference of a cam barrel 65. The cam barrel 65 is located on an inner circumference of the control barrel 63. Three cam-followers 65a are formed on the outer circumference.

The cam-followers 65a are engaged with the control barrel 63 and rotate with respect to the control barrel 63 to extend and retract from the cam groove 63e. The cam barrel 65 comprises holes 65b defined thereon and three cam barrel guide shafts 66 inserted therein. The cam barrel guide shafts 66 penetrate through the holes 63f of the control barrel 63 to engage with the straight groove 62e in the optical axial direction on the inner circumference of the rotary barrel 62. Thus, the cam barrel 65 does not rotate with respect to the rotary barrel 62, but is movable in the optical axial direction.

Namely, when the rotary barrel 62 rotates with the control barrel 63, the cam barrel 65 moves in and out along the cam groove 63 of the control barrel 63.

Figure 10:
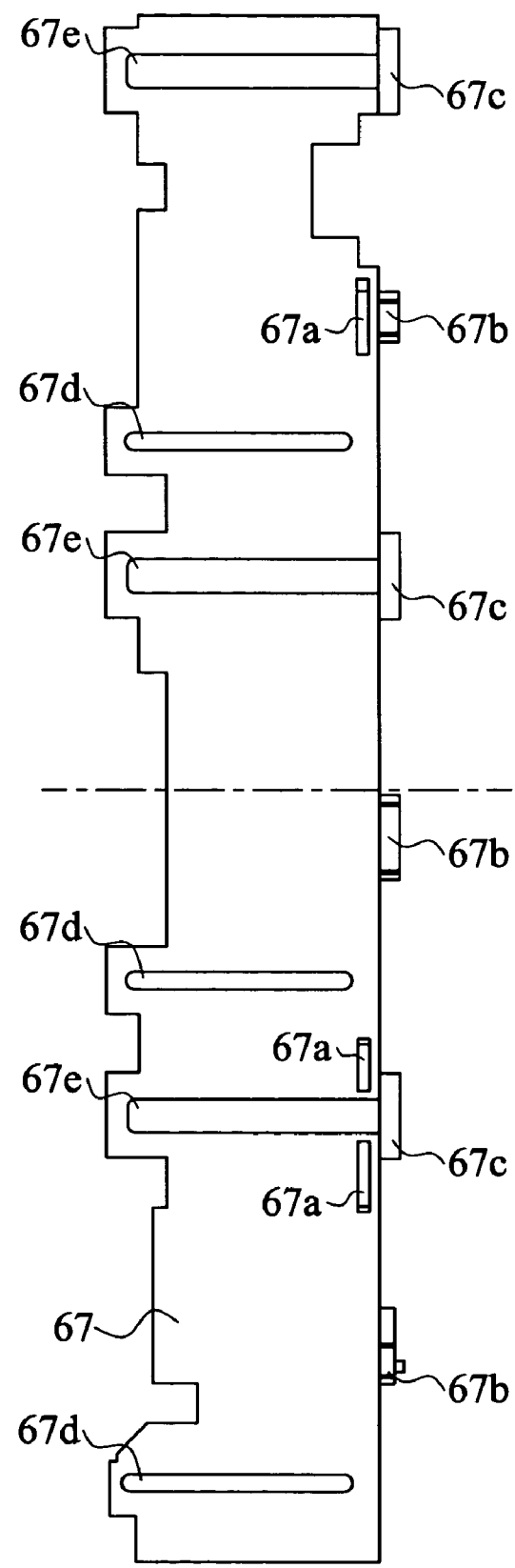
FIG. 10 is a development viewed from an outer circumference of a straight barrel.

FIG. 10 is a development viewed from an outer circumference of a straight barrel 67. The straight barrel 67 is disposed on an inner side of the cam barrel 65. The hook 65c on the inner circumference of the cam barrel 65 grasps protrusions 67a and 67b on the outer circumference of the straight barrel 67 such that movement in the optical axial direction is controlled and the cam barrel 65 and the straight barrel 67 are mutually rotatably supported. The guiding hook 67c disposed on the outer circumference of the straight barrel 67 is engaged with the straight groove 63g in the optical axial direction on the inner circumference of the control barrel 63. Thus, the straight barrel 67 cannot rotate with the control barrel 63 but can rotate in the optical axial direction.

Figure 11:
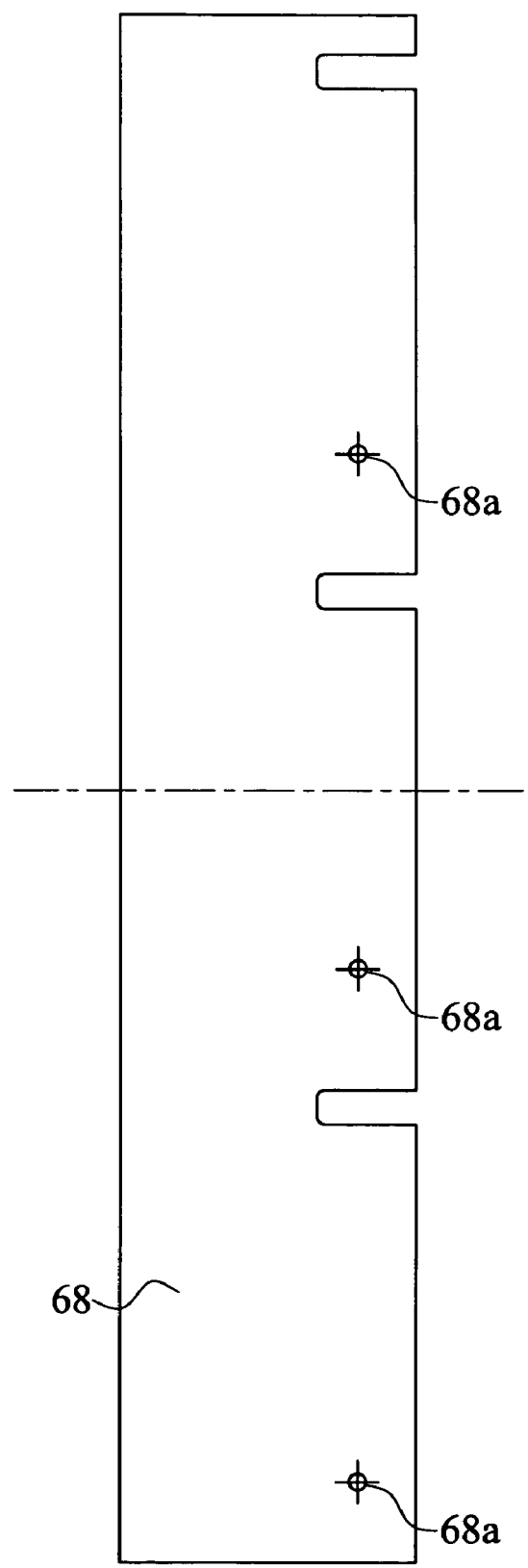
FIG. 11 is a development viewed from an outer circumference of a first-lens frame.

FIG. 11 is a development viewed from an outer circumference of a first lens frame 68. The first lens frame 68 is disposed on an inner side of the cam barrel 65 and supports the first lens group 31. Three cam-followers 69 of the first lens frame are inserted into the holes 68a of the first lens frame 68, and the cam-follower portion 69a on the outer periphery of the cam-followers 69 is engaged with the cam groove 65d on the inner circumference of the cam barrel 65. Additionally, a guiding portion 69b on the inner side of the cam-follower 69 of the first lens frame is engaged with a straight guiding hole 67d of the straight barrel 67 in the optical axial direction. Thus, the cam barrel 65 rotates with respect to the straight barrel 67, and the cam barrel 65 rotates with respect to the control barrel 63, corresponding to relative rotations between the straight barrel 67 and the control barrel 63, such that the first lens frame 68 can extend or retract along the cam groove 65d of the cam barrel 65 in the optical axial direction.

Figure 12:
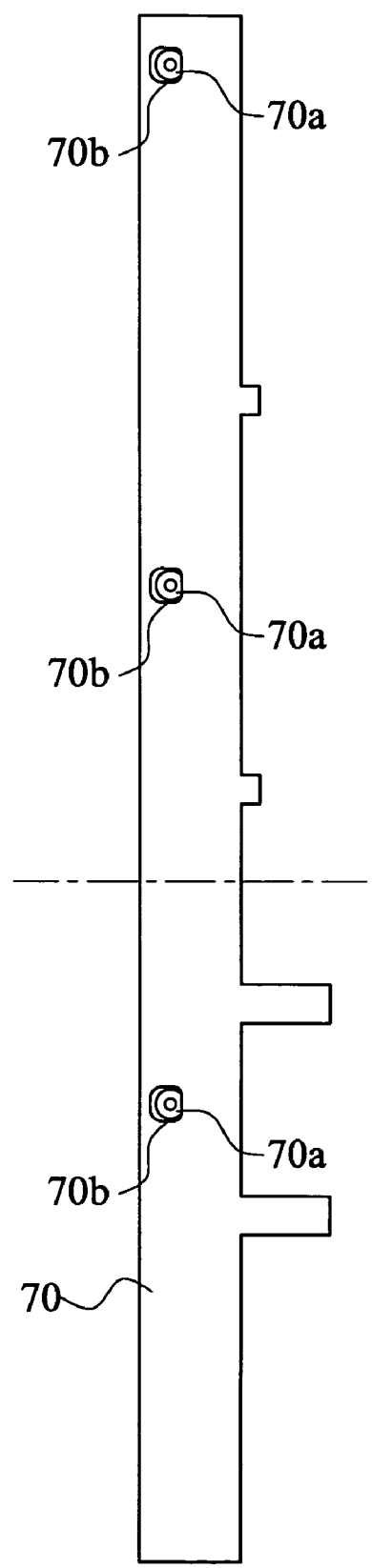
FIG. 12 is a development viewed from an outer circumference of a second lens frame.

FIG. 12 is a development viewed from an outer circumference of a second lens frame 70. The second lens frame 70 is disposed on an inner side of the straight barrel 67 and supports the second lens group 32. Three cam-followers 70a formed on the outer circumference of the second lens frame 70 are engaged with the cam groove 65e on the inner circumference of the cam barrel 65. Additionally, a root 70b of the cam-followers 70a of the second lens frame 70 is engaged with a straight guiding hole 67e of the straight barrel 67 in the optical axial direction. Thus, the cam barrel 65 rotates with respect to the straight barrel 67, and the cam barrel 65 rotates with respect to the control barrel 63, corresponding to relative rotations between the straight barrel 67 and the control barrel 63, such that the second lens frame 70 can extend or retract along the cam groove 65e of the cam barrel 65 in the optical axial direction.

The second lens frame 70 comprises a shutter unit 71 for blocking incident light from the side of the photographic subject. The shutter unit 71 is disposed on an actuator 71a. A flexible printed circuit board (FPC) for shutter 72 connects the actuator 71a and the camera control circuit. The FPC 72 passing from the shutter unit 71 through the internal of the lens barrel 2 is connected to another lens driving FPC 51 disposed behind the CCD holder 21.

A bias spring 73 is disposed between the first lens frame 68 and the second lens frame 70 such that the first lens frame 68 and the second lens frame 70 are biased to each other in the optical axial direction and detached from each other. Thus, the cam engaging portion of the cam barrel 65 of the first lens frame 68 and that of the cam barrel 65 of the second lens frame 70 can be eliminated, stabilizing the optical performance.

The movement of the lens barrel 2 from a housed position to a photographing position is discussed in the following.

Figure 13:
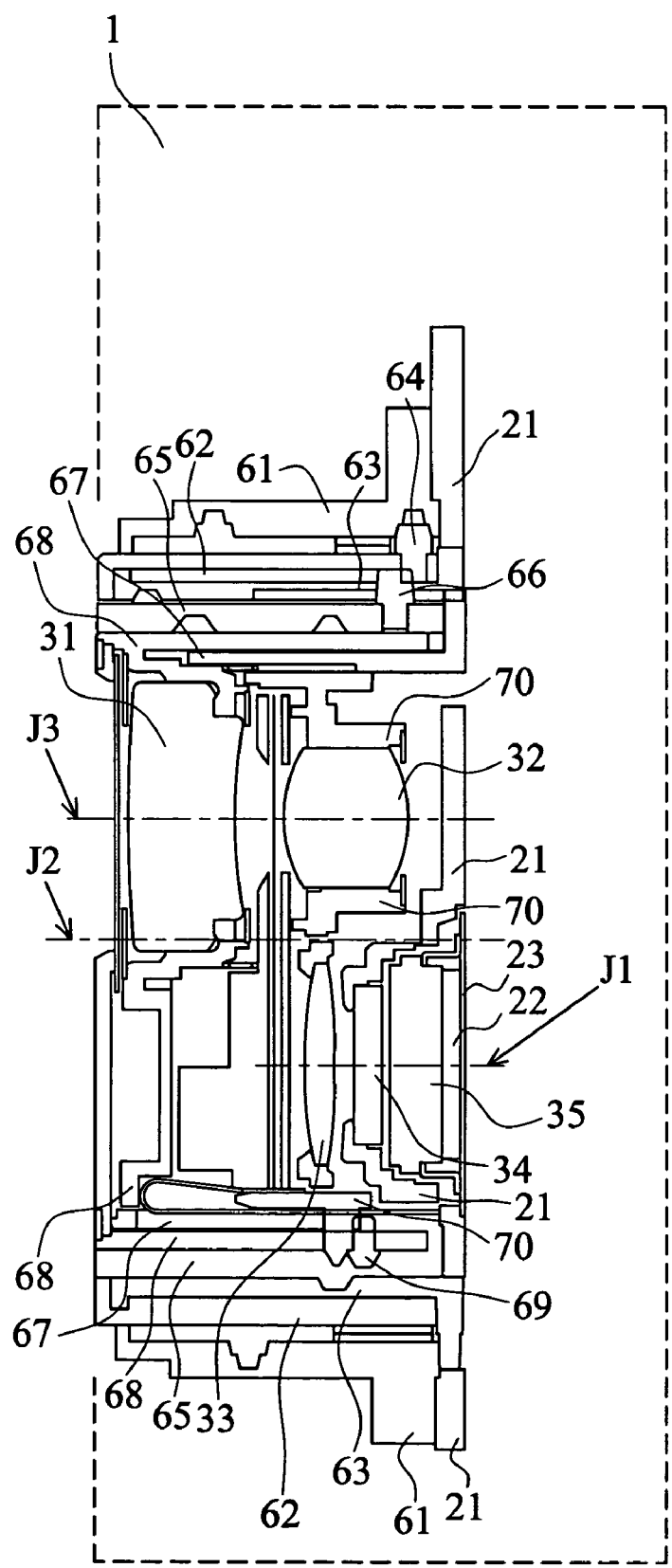
FIG. 13 is a cross section of a lens barrel in a housed position.
Figure 14:
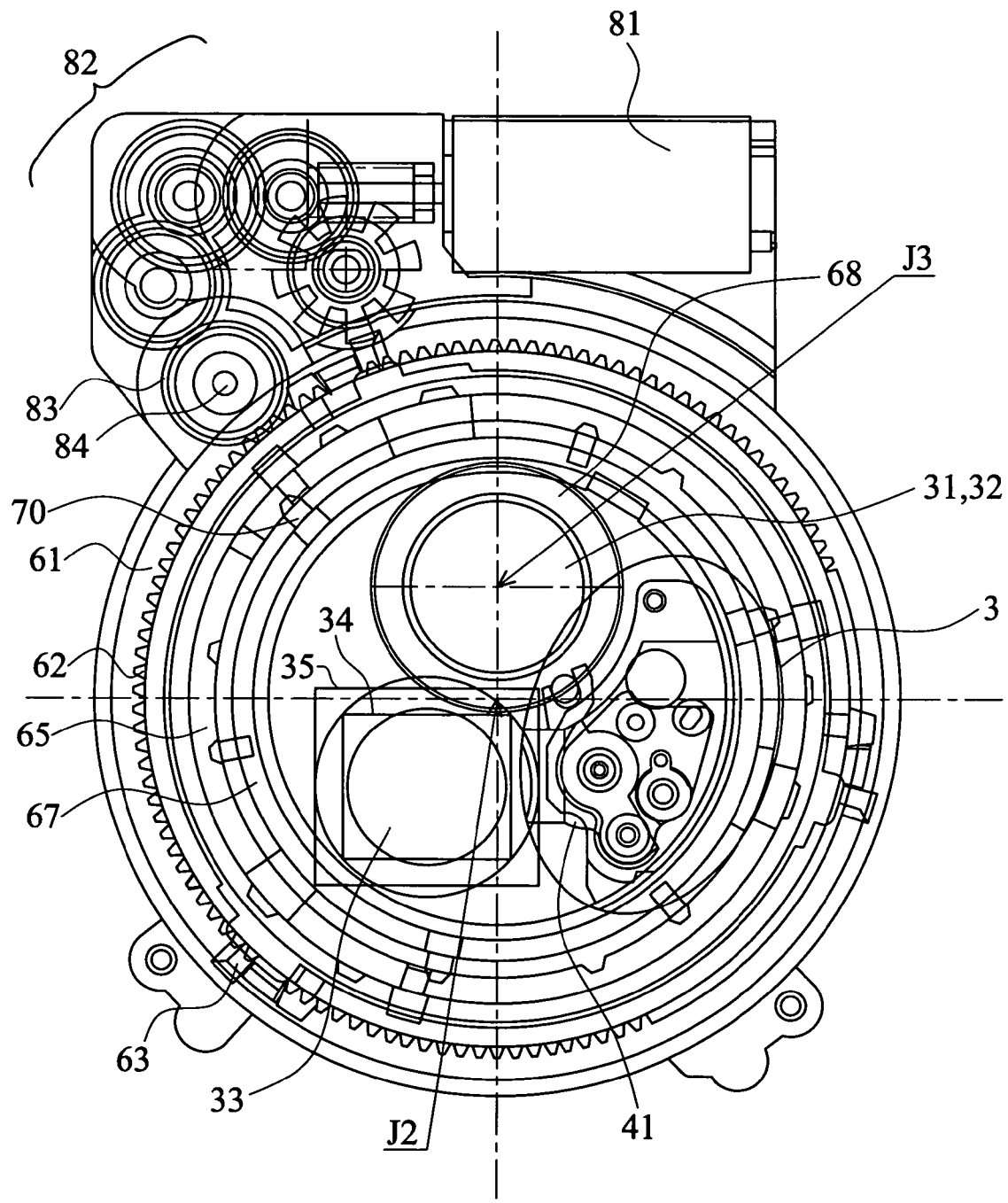
FIG. 14 is a front perspective view of a lens barrel in a housed position.

FIG. 13 is a cross section of a lens barrel 2 in a housed position. FIG. 14 is a front perspective view of a lens barrel 2 in a housed position. The central axis of the first lens group 31 and the second lens group 32 is defined as "J3", housed at a side of the third lens group 33, the low-pass filter 34, and the CCD 35, at a position biased from the photographic optical axis J1 at the side of the focus drive mechanism 3. Namely, the first lens group 31, the second lens group 32, the third lens group 33, the low-pass filter 34, the CCD 35, and three blocks of the focus drive mechanism 3 are housed on a plane, substantially perpendicular to the optical axis.

Figure 15:
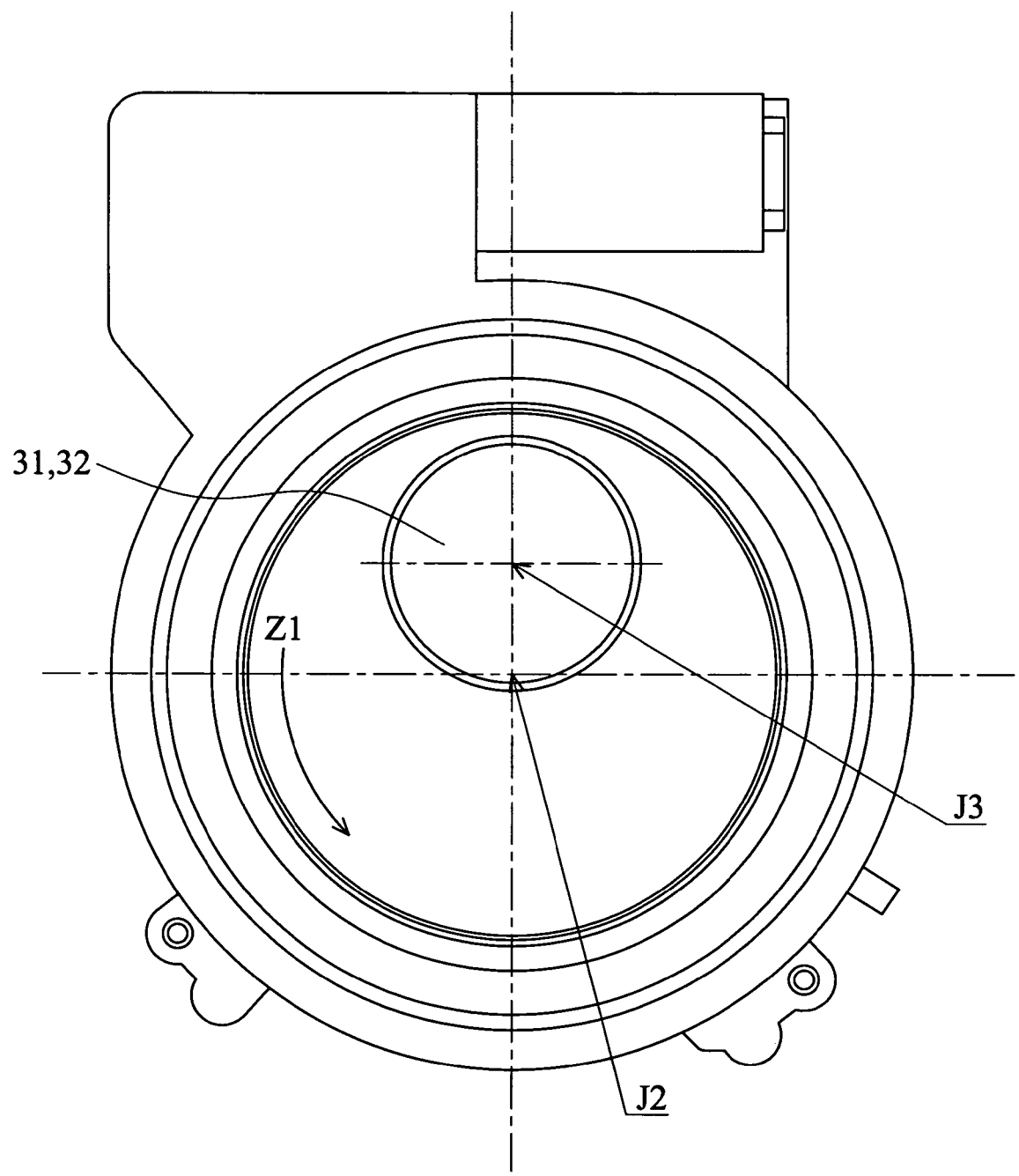
FIG. 15 is a front view of a lens barrel in a housed position.
Figure 16:
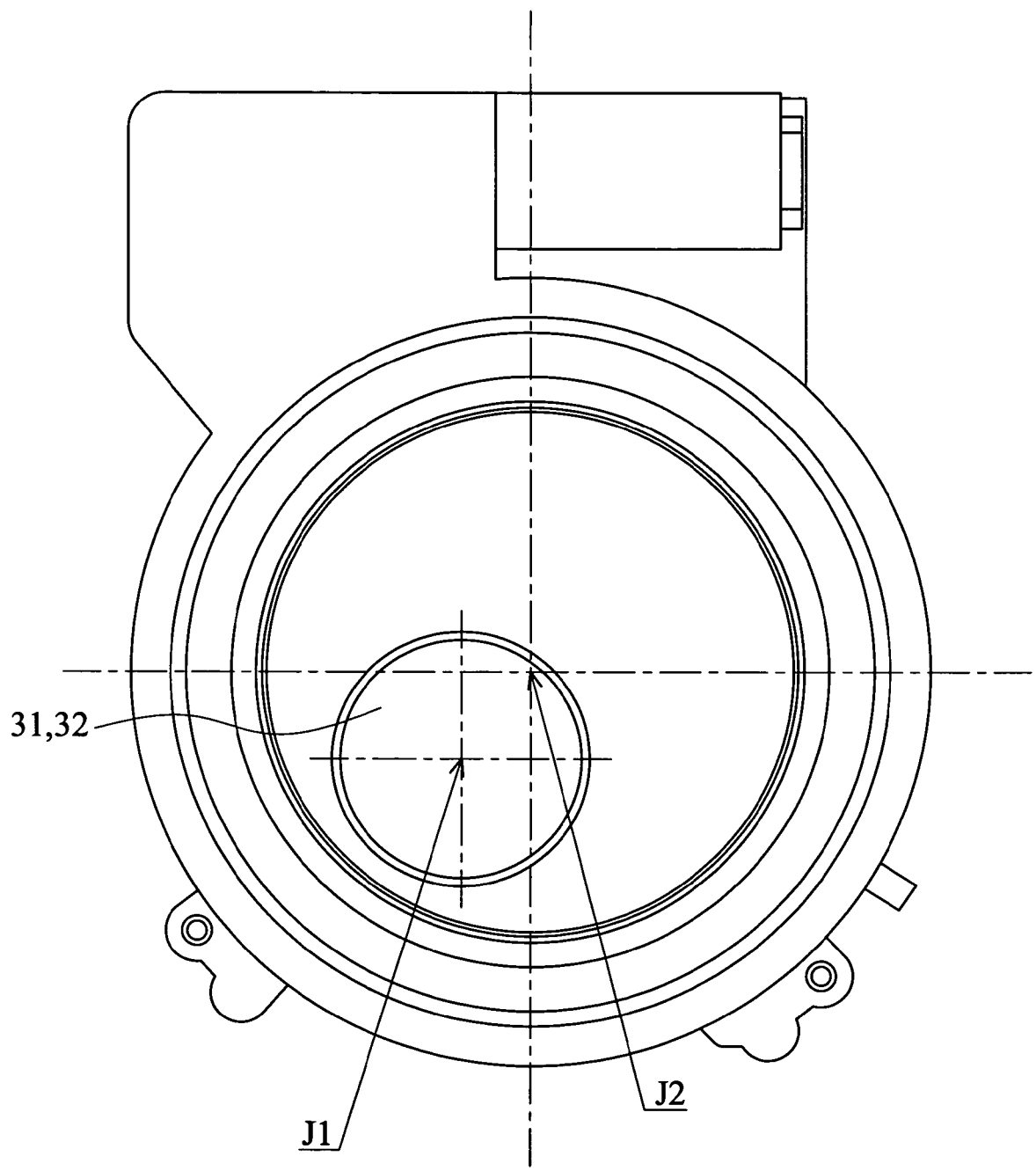
FIG. 16 is a front view of a lens barrel in a photographing position.

The first and second lens groups 31 and 32 rotate about the central axis J2 of the lens barrel 2 as a center, and are extended in the optical axial direction to a photographing position, as shown in FIG. 1. If viewed from a front view of the lens barrel 2, as shown in FIG. 15, the first and second lens groups 31 and 32 rotate in a direction Z1 and extend to the photographing position of FIG. 16. In the photographing position, the central axis J3 of the first and second lens groups 31 and 32 corresponds to the photographic optical axis J1. An eccentric distance between the central axis J2 of the lens barrel 2 and the photographic optical axis J1 is equal to an eccentric distance between the central axis J2 of the lens barrel 2 and the central axis J3 of the first and second lens groups 31 and 32.

Figure 17:
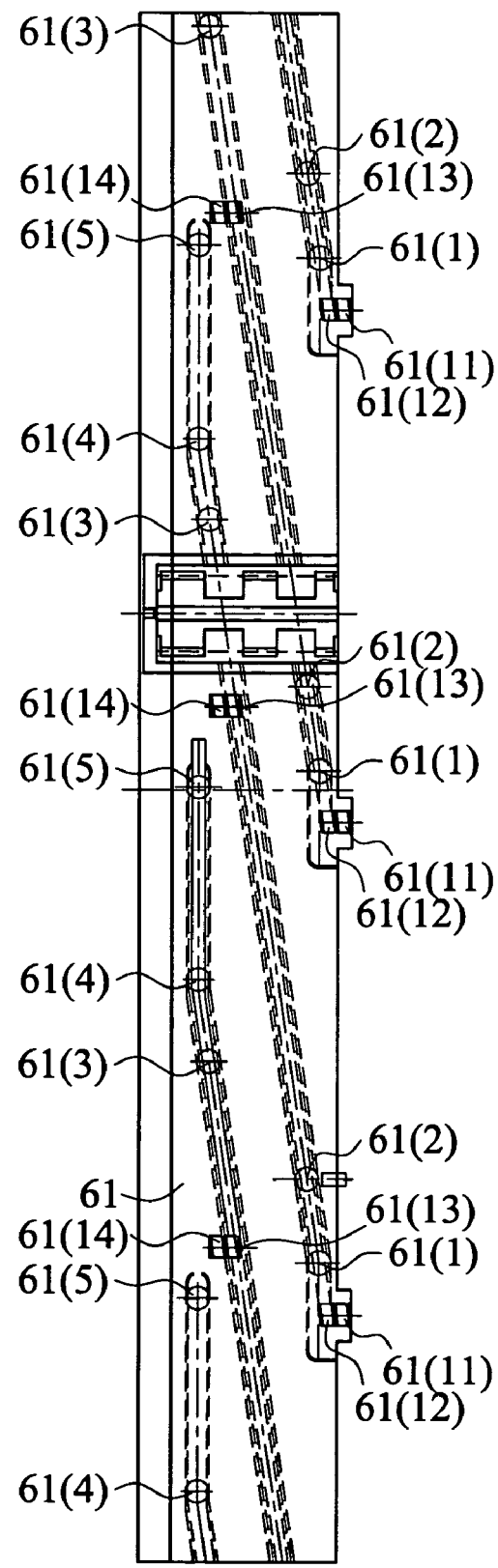
FIG. 17 is a schematic view indicating positions of cam grooves of a fixing barrel.
Figure 18:
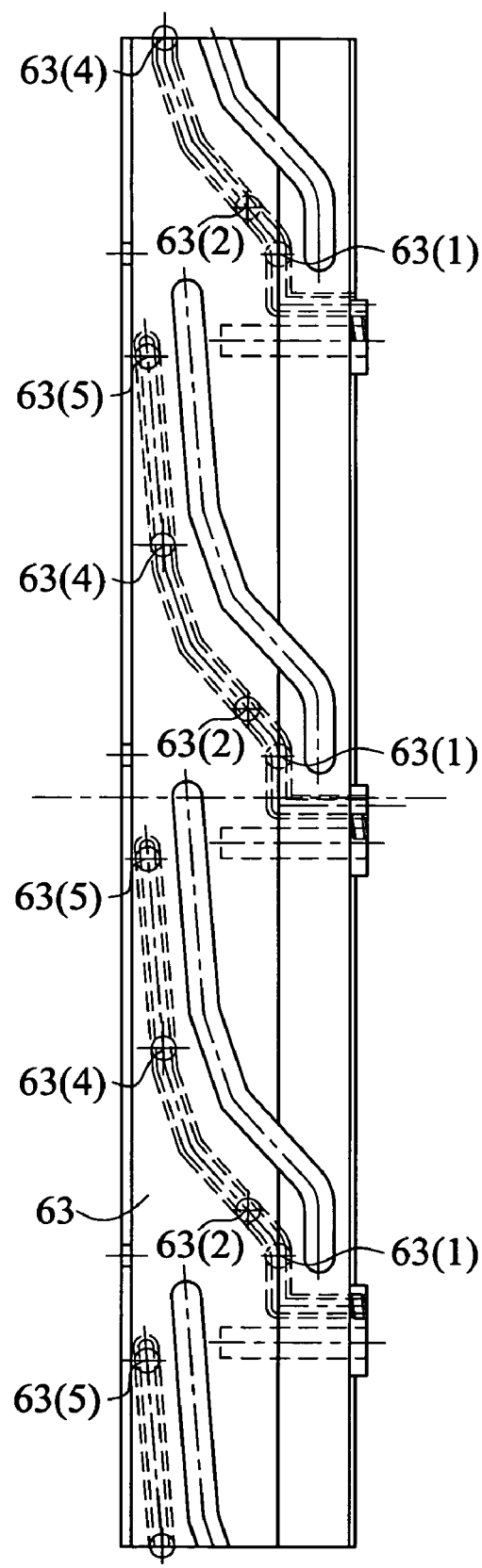
FIG. 18 is a schematic view indicating positions of cam grooves of a control barrel.
Figure 19:
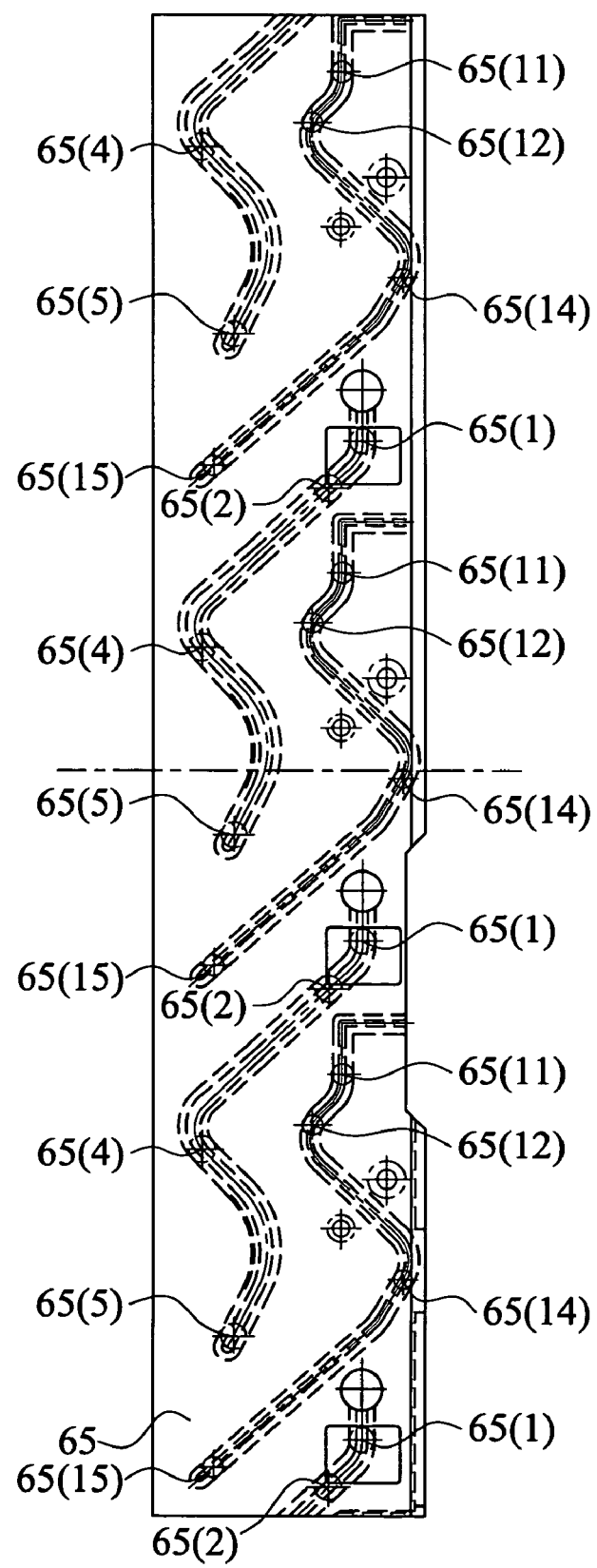
FIG. 19 is a schematic view indicating positions of cam grooves of a cam barrel.

When the lens barrel 2 is in a housed position, the cam-follower 64 of the rotary barrel 62 is disposed at a position 61(1) of the cam groove of the fixing barrel 61. The cam-follower 65a of the cam barrel 65 is disposed at a position 63(1) of the cam groove of the control barrel 63. A cam-follower pin 69 inserted into the first lens frame 68 is disposed at a position 65(1) of the cam groove of the cam barrel 65. A cam-follower 67 of the second lens frame 70 is disposed at a position 65(11) of the cam groove of the cam barrel 65, as shown in FIGS. 17, 18, and 19.

By rotating the zoom gear 83, the rotary barrel 62 rotating about the central axis J2, the rotary barrel cam-follower pin 64 is withdrawn in the optical axial direction from the position 61(1) of the cam groove of the fixing barrel 61 to the position 61(2). Additionally, the control barrel 63 controls the movement of the rotary barrel 62 in the optical axial direction, and is extended in the optical axial direction from the position 61(11) to the position 61(12) via the guidance of the cam groove 61b of the fixing barrel 61. The control barrel 63 moving between the position 61(11) and 61(12) of the cam groove of the fixing barrel 61 such that relative rotation is generated between the rotary barrel 62 and the control barrel 63. The cam-follower 65a of the cam barrel 65 moves from position 63(1) to 63(2) of the cam groove of the control barrel 63, and meanwhile, in order to generate relative rotation between the cam barrel 65 and the control barrel 63, the first lens frame cam-follower pin 69 moves from the position 65(1) to 65(2) of the cam groove of the cam barrel 65, and the second lens frame cam-follower pin 70a moves from the position 65(11) to 65(12) of the cam groove of the cam barrel 65.

When the rotary barrel cam-follower pin 64 reaches a position 61(12) of the cam groove of the fixing barrel 61, the cam-follower 63b of the control barrel 63 is driven at the position 61(12) of cam groove of the fixing barrel 61. The cam-follower 65a of the cam barrel 65 is driven at the position 63(2) of cam groove of the control barrel 63. The cam-follower pin 69 of the first lens frame is driven at the position 65(2) of cam groove of the cam barrel 65. The cam-follower 70a of the second lens frame 70 is driven at the position 65(12) of the cam groove 65.

Due to the above motions, the control barrel 63, the cam barrel 65, the first lens frame 68, and the second lens frame 70 are directly extended in the optical axial direction. Thus, the first lens group 31 and the second lens group 32 are extended from the photographic subject side in the optical axial direction.

As a result, before rotational movement of the first lens group 31 and the second lens group 32, the first lens group 31 and the second lens group 32 are at a position not interfering with the third lens group 33, the low-pass filter 34, the CCD 35, and the focus drive mechanism 3 when extending.

As the cam-follower pin 64 of the rotary barrel is extended while rotating from a position 61(2) of the cam groove of the fixing barrel 61 to the position 61(3) to extend the rotary barrel 62, the cam-follower 63b of the control barrel 63 reaches the position 61(13) of the fixing barrel 61. During the motion, the extended amount of the angle of the rotary barrel 62 is the same as that of the angle of the control barrel 63 such that the cam grooves 61a and 61b of the fixing barrel 61 are formed without relative rotation between the rotary barrel 62 and the control barrel 63.

Thus, the rotary barrel 62, the control barrel 63, the cam barrel 65, the straight barrel 67, the first lens frame 68, the second lens frame 70 are extended together by rotating about the central axis J2.

During rotation, when the cam-follower pin 64 of the rotary barrel passes through the position 61(13) of the cam groove of the fixing barrel 61, since the cam groove 61b thereof is deeper than the cam groove 61a, the cam-follower pin 64 of the rotary barrel is engaged with the cam groove 61a of the fixing barrel 61 at position 61(14). Since the protrusion 62b of the rotary barrel 62 is substantially engaged with the cam groove 61a of the fixing barrel 61, the zooming can be extended without varying loading. Namely, the cam-follower pin 64 of the rotary barrel is corresponding to the main guiding portion of the cam groove 61a of the fixing barrel 61. However, the cam-follower pin 64 passing through the position 61913) of the cam groove of the fixing barrel 61 is restricted, and thus, it is guided by a secondary guiding portion, which is a protrusion 62b of the rotary barrel 62. "Substantially engaged", as mentioned above, is defined in that engagement of the protrusion 62b of the rotary barrel 62 of the secondary guiding portion, compared with the engagement of the cam-follower 64 of the main guiding portion, does not over-limit guiding performance thereof.

When the cam-follower pin 64 of the rotary barrel is at the position 61(3) of the cam groove of the fixing barrel 61, and the cam-follower 63b of the control barrel 63 reaches the position 61(13), the photographic optical axis J1 and the central axes J3 of the first and second lens group 31, 32 coincide.

If the cam follower pin 64 of the rotary cam is rotated from the position 61(3) of the cam groove of the fixing barrel 61 to the position 61(4) while extending therefrom, the cam-follower 63b of the control barrel 63 moves from the position 61(13) to the position 61(14), extending in the optical axial direction. The above motion has the same situation as when the cam-follower pin 64 of the rotary barrel is moved from the position 61(1) to 61(2). That is, the relative rotation between the cam barrel 65 and the control barrel 63 makes the cam-follower pin 69 of the first lens frame move from the position 65(2) to the position 65(4) of the cam groove of the cam barrel 65, and the cam-follower 70a of the second lens frame 70 move from the position 65(12) to the position 65(14). This position is the full zoom position of the lens barrel 2, same as position of the cross section of FIG. 1.

Zooming motion from a full zoom to a minimum zoom of photographic position is discussed in the following.

Figure 20:
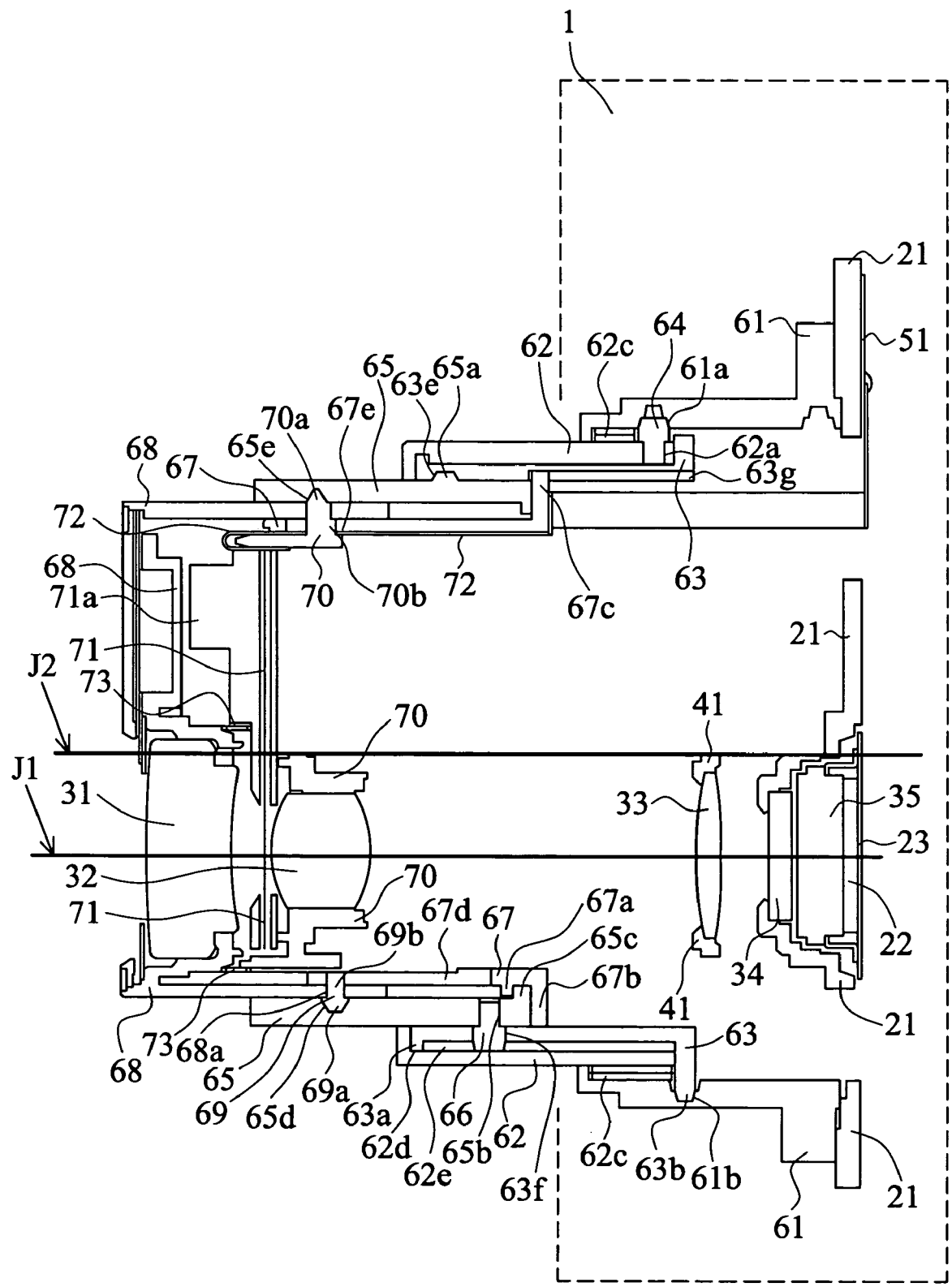
FIG. 20 is a cross section of a lens barrel at a minimum zoom of photographing position.

When the zoom gear 83 rotates, and the rotary barrel 62 rotates, the cam follower pin 64 of the rotary barrel is moved from a position 61(4) of the cam groove of the fixing barrel 61, a full zoom of the photographic position, to a position 61(5). The cam groove of the fixing barrel 61 in this range is perpendicular to the optical axial direction. The rotary barrel is extended in the optical axial direction and rotated about the axis J2. The control barrel 63 is stopped. Meanwhile, the rotary barrel 62 and the control barrel 63 rotate relatively to each other such that the cam-follower 65a of the cam barrel 65 is moved from the position 63(4) to the position 63(5) of the cam groove of the control barrel 65. The cam barrel 65 and the control barrel rotate relatively to each other such that the cam-follower pin 69 of the first lens frame is moved from the position 65(4) to the position 65(5). The cam-follower 70a of the second lens frame 70 is guided from the position 65(14) to the position 65(15) of the cam barrel 65. Since the control barrel 63 is stopped, the first lens frame 68 for supporting the first lens group 31 and the second lens frame 70 for supporting the second lens group 32, move in and out in the optical axial direction, respectively, while rotating about the central axis J2. Each cam groove of the cam barrel 65 and the control barrel 63 is formed from the full zoom to the minimum zoom with various zooming distance therebetween. FIG. 20 is a cross section of a lens barrel 2 at the minimum zoom of photographing position.

When it is moved from the minimum zoom to the full zoom of the photographing position, the zoom gear 83 can rotate in an opposite direction. The control of the zoom motor 81 for driving the zoom gear 83 can obtain any focal distance. If it is moved from the full zoom to the housed position, the zoom gear can also rotate in an opposite direction to achieve a housed position, as shown in FIG. 13.

Figure 21:
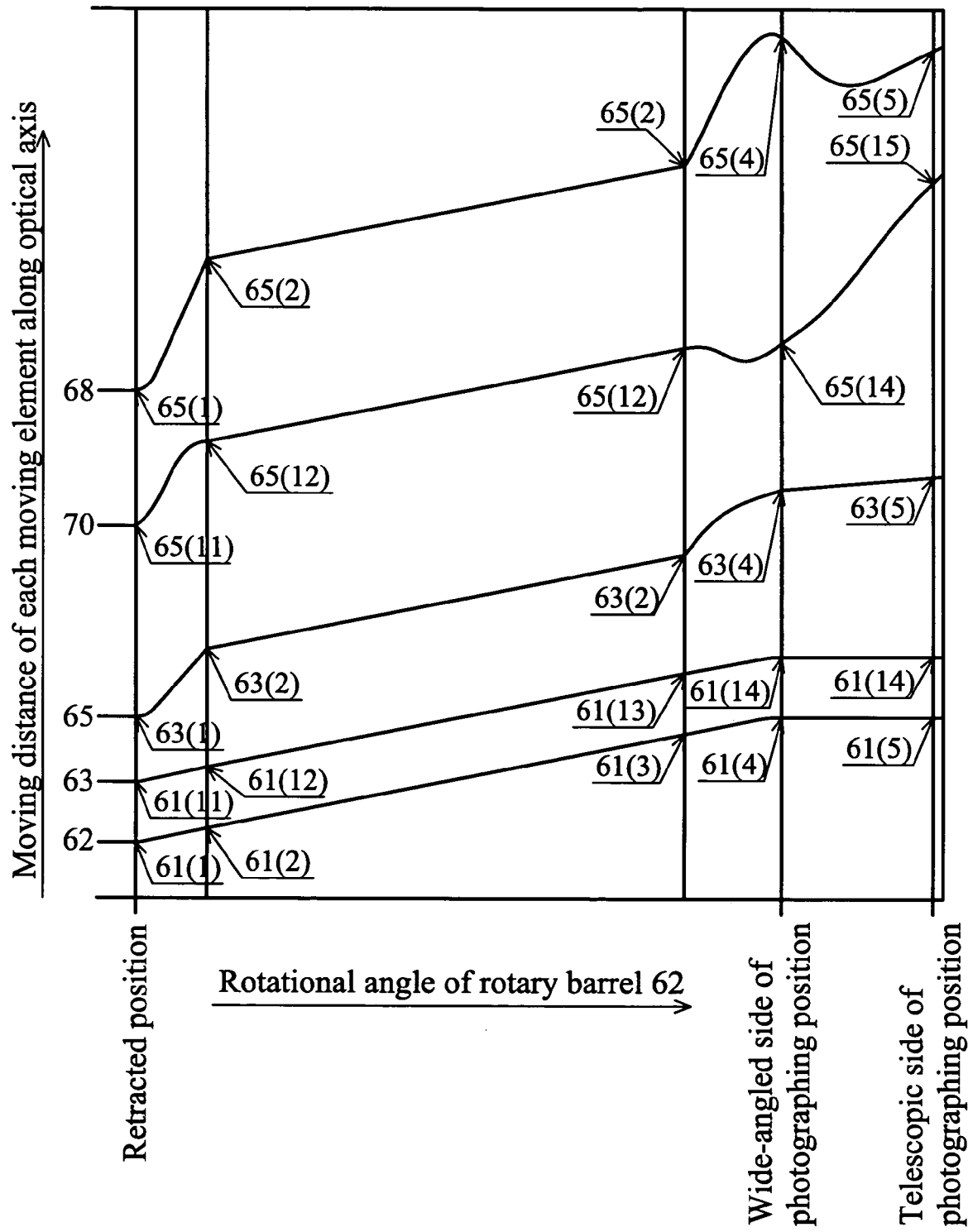
FIG. 21 is a relationship between the rotational angle of the rotary barrel and moving distance of each moving element along an optical axis.

FIG. 21 is a relationship between the rotational angle of the rotary barrel and the moving distance of each moving element along an optical axis. The horizontal axis represents the rotational angle of the rotary barrel 62. The vertical axis represents the absolute moving distance of the rotary barrel 62, the control barrel 63, the cam barrel 65, the first lens frame 68, and the second lens frame 70 in the optical axial direction. The positions of each moving element passing therethrough (as shown in FIGS. 17, 18, and 19) are shown in FIG. 21. Thus, the movement relationship of each element of the lens barrel 2 in the optical axial direction.

Figure 22:
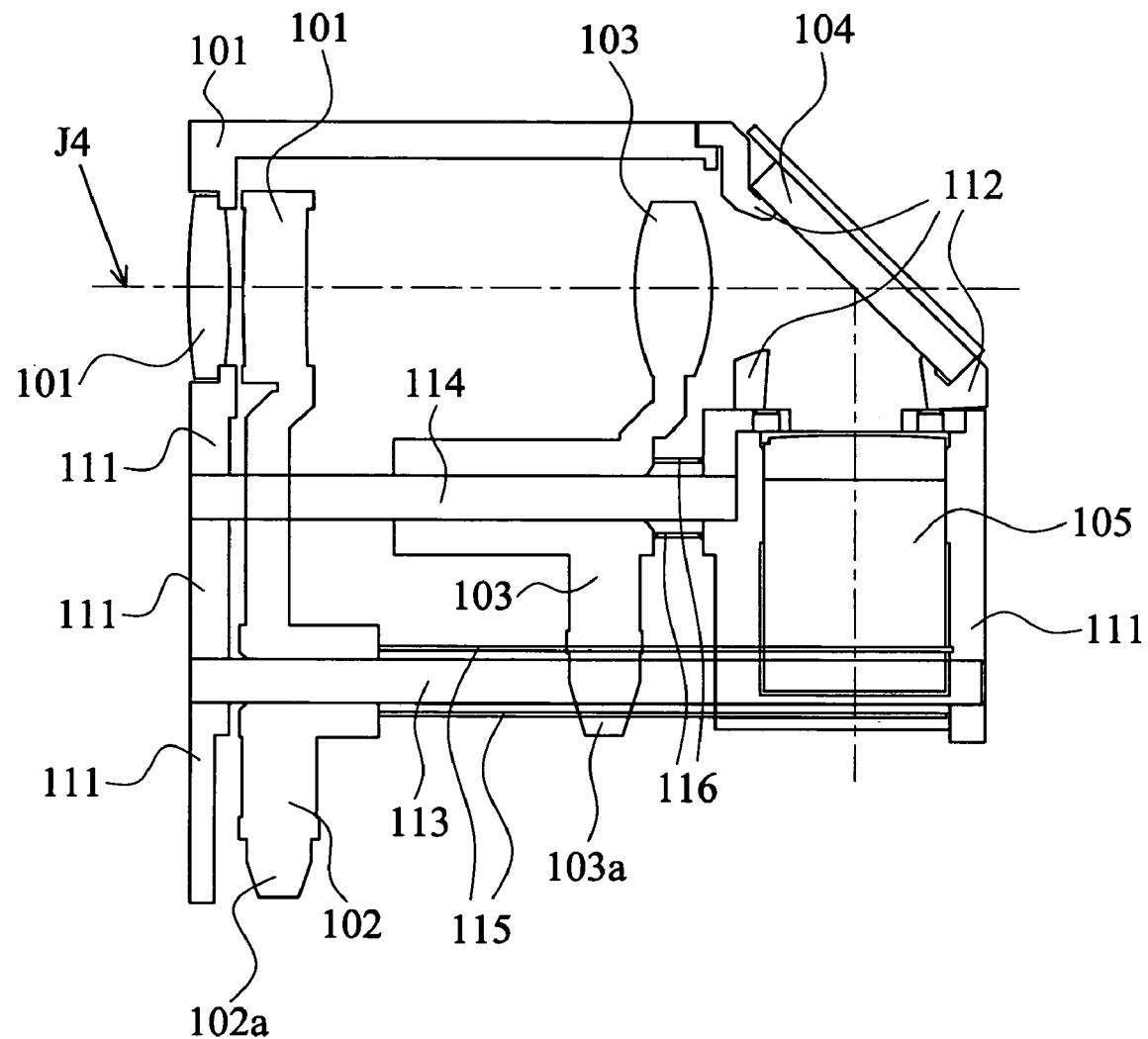
FIG. 22 is a cross section along a finder objective side at a full zoom of a viewing position.
Figure 23:
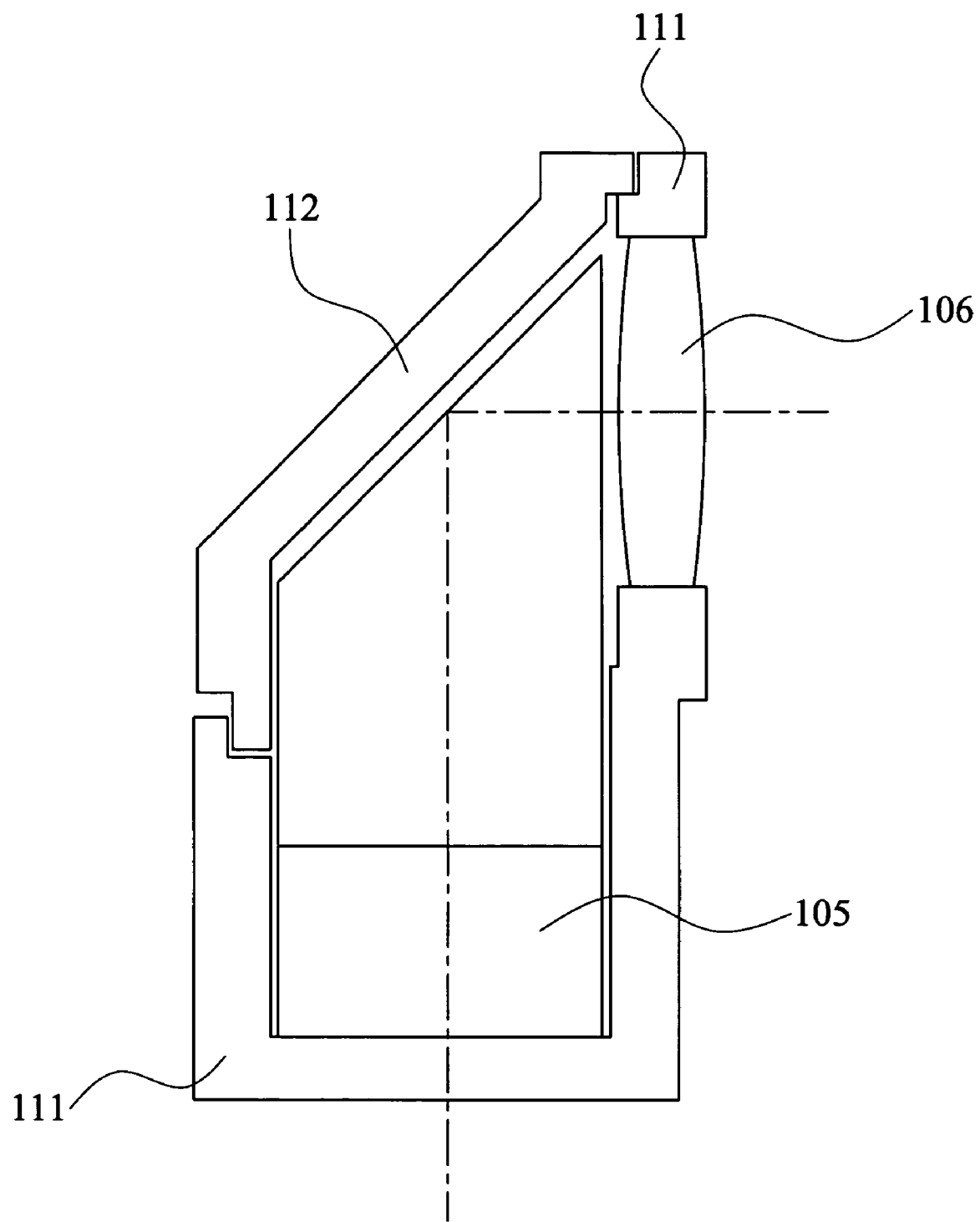
FIG. 23 is a cross section along a finder eyepiece side.

The zoom lens barrel 2 comprises a zoom finder unit 4 for continuous zooming movement of the lens groups. FIG. 22 is a cross section along a finder objective side at a full zoom of a viewing position. FIG. 23 is a cross section along a finder eyepiece side. The zoom finder unit 4 comprises an objective lens 101, a first movable lens 102, a second movable lens 103, a reflective lens 104, a prism 105, and an objective lens 106. A finder optical axis of the objective lens 101 disposed at the objective side, the first movable lens 102, the second movable lens 103, and the reflective lens 104 is defined as J4. The finder optical axis J4 at the objective side is parallel to the photographic optical axis J1.

The objective lens 101 and the prism 105 are fixed on a finder frame A111. The reflective lens 104 and the objective lens are fixed on another finder frame B112. The first movable lens 102 is slidably disposed on a first movable lens guide shaft 113 of the finder frame A111, movable in the direction of an objective finder optical axis J4. The second movable lens 104 is slidably disposed on a second movable lens guide shaft 114 of the finder frame A111, movable in the direction of an objective finder optical axis J4. The first movable lens 102 and the second movable lens 103 comprise cam-followers 102*a* and 103*a*, respectively. The cam-followers 102*a* and 103*a* receive driving force from the lens barrel 2, movable in an intended locus of the first movable lens 102 and the second movable lens 103 in the optical axial direction. Additionally, in order to eliminate the cam-followers 102*a*, 103*a* of the first movable lens 102 and the second movable lens 103, a first movable lens spring 115 and a second movable lens spring 116 are biased in the optical axial direction. The mentioned zoom finder unit is disposed on the fixing barrel 61, as shown in FIG. 24.

Figure 25:
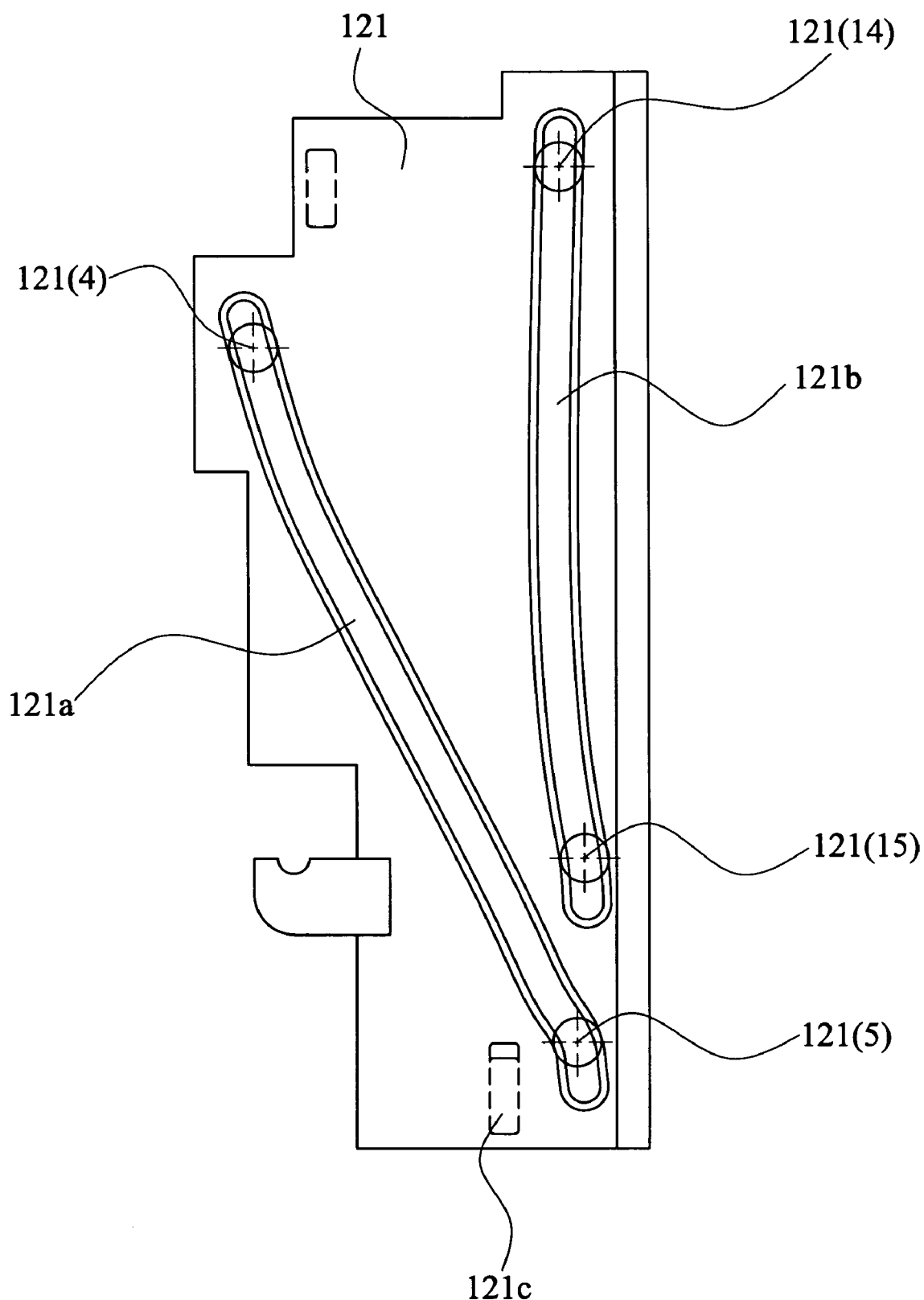
FIG. 25 is a development viewed from an outer circumference of a finder cam barrel.

The arc-shaped finder cam barrel 121 driven by the first movable lens 102 and the second movable lens 103 of the zoom finder unit 4 is disposed on an outer circumference of the fixing barrel 61. FIG. 25 is a development viewed from an outer circumference of a finder cam barrel 121. The finder cam barrel 121 is rotatably supported on the central axis J2 of the lens barrel. Two cam grooves 121*a*, 121*b* are formed on the outer circumference thereof. The cam groove 121*a* is engaged with the cam-follower 102*a* of the first movable lens 102, and the cam groove 121*b* is engaged with the cam-follower 103*a* of the second movable lens 103.

Figure 26:
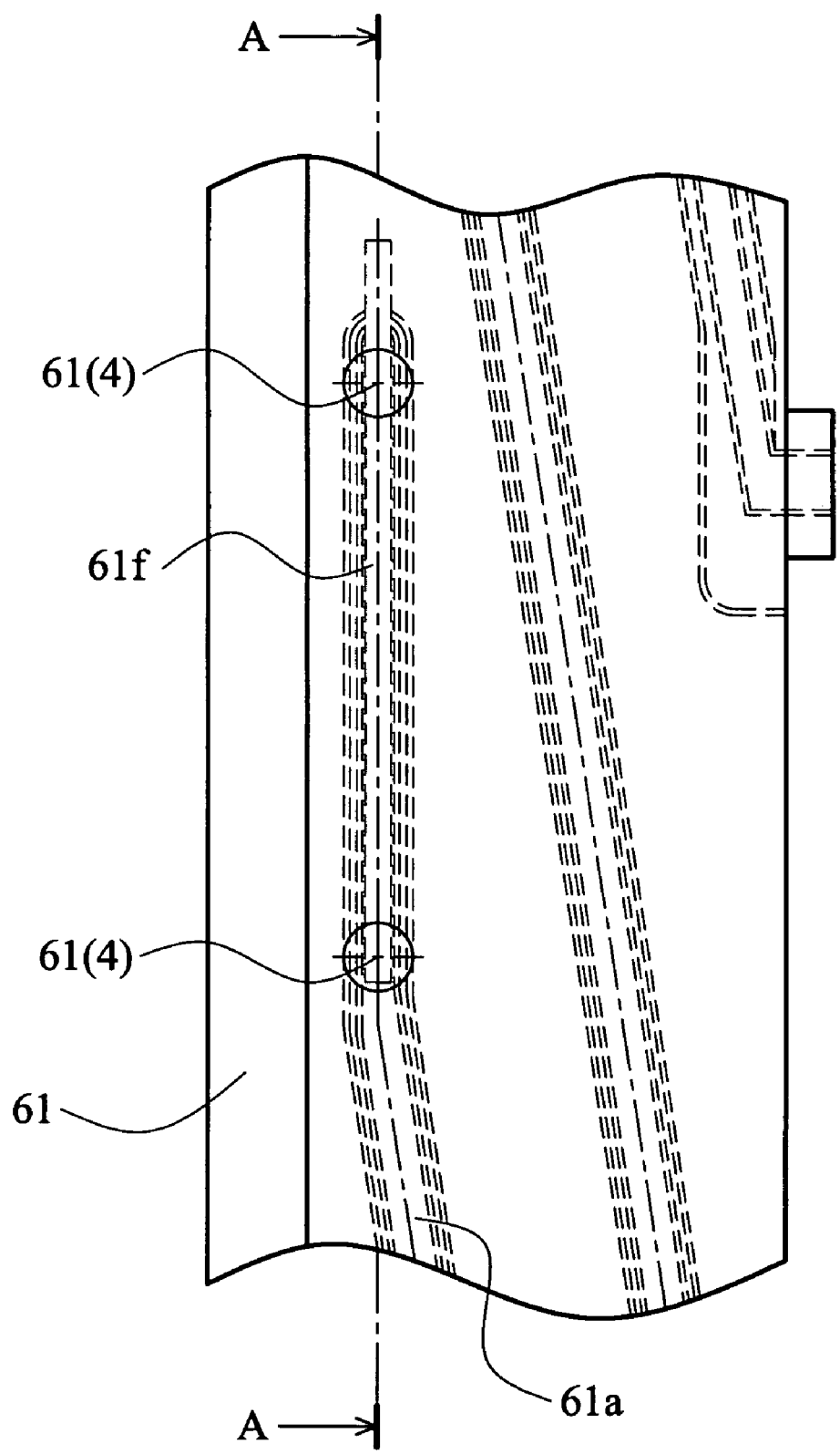
FIG. 26 is a partial development viewed from an outer circumference of a fixing barrel.
Figure 27:
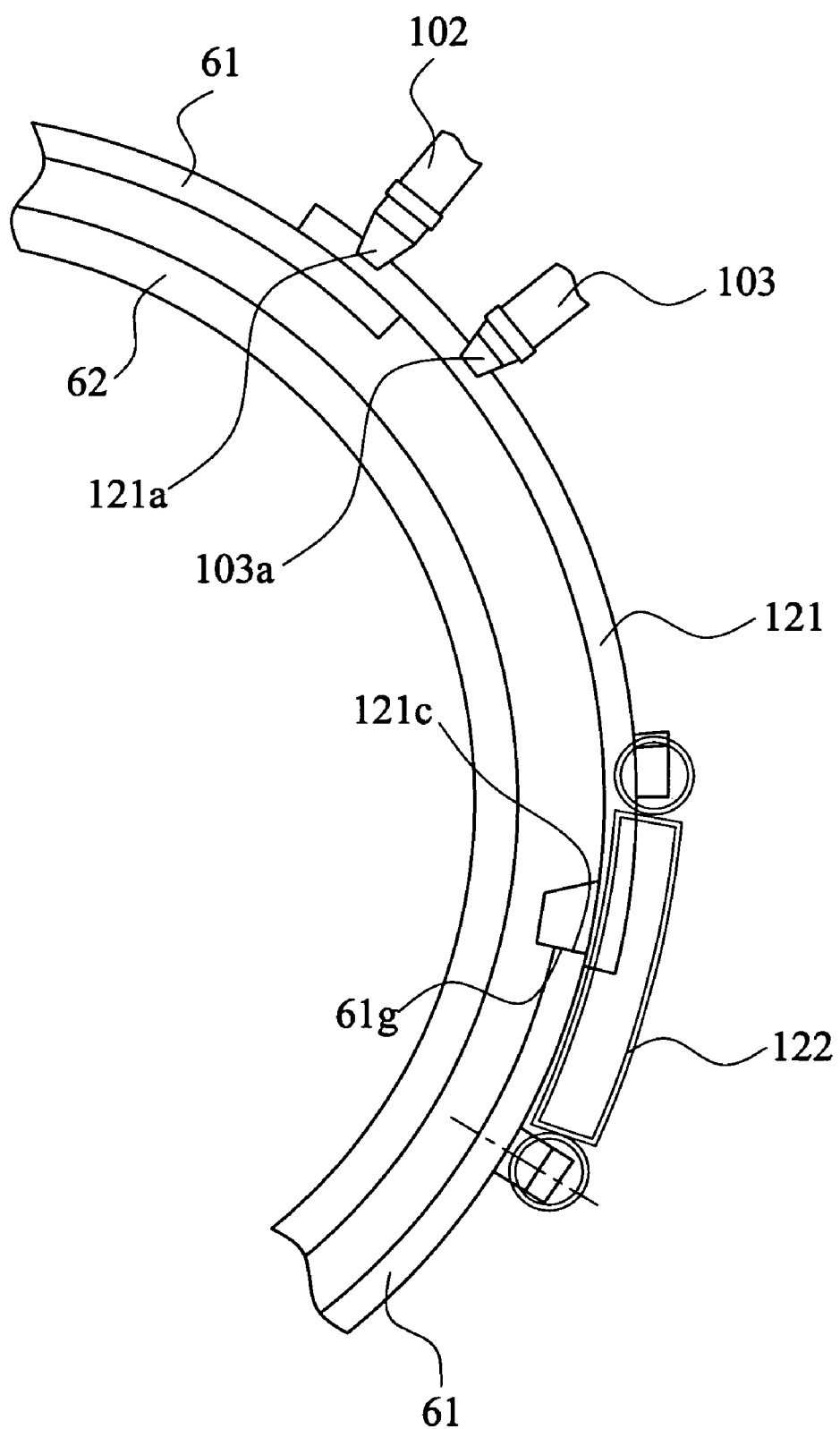
FIG. 27 is a cross section along line A—A of FIG. 26 in a housed position.

The inner circumference of the finder cam barrel 121 comprises a protrusion 121*c*. Additionally, one of the cam groove 61*a* of the cam-follower pin 64 of the rotary cam engaged with the fixing barrel 61 comprises through-holes formed on a bottom surface of the cam groove between the position 61(4) and 61(5). FIG. 26 is a partial development viewed from an outer circumference of the fixing barrel 61. FIG. 27 is a cross section along line A—A of in a circumferential direction of the through-hole 61*f* at the bottom surface of the cam groove in a housed position. The protrusion 121*c* of the finder cam barrel 121 is inserted in the through-hole 61*f* of the fixing barrel 61, providing circumferential guidance.

Figure 24:
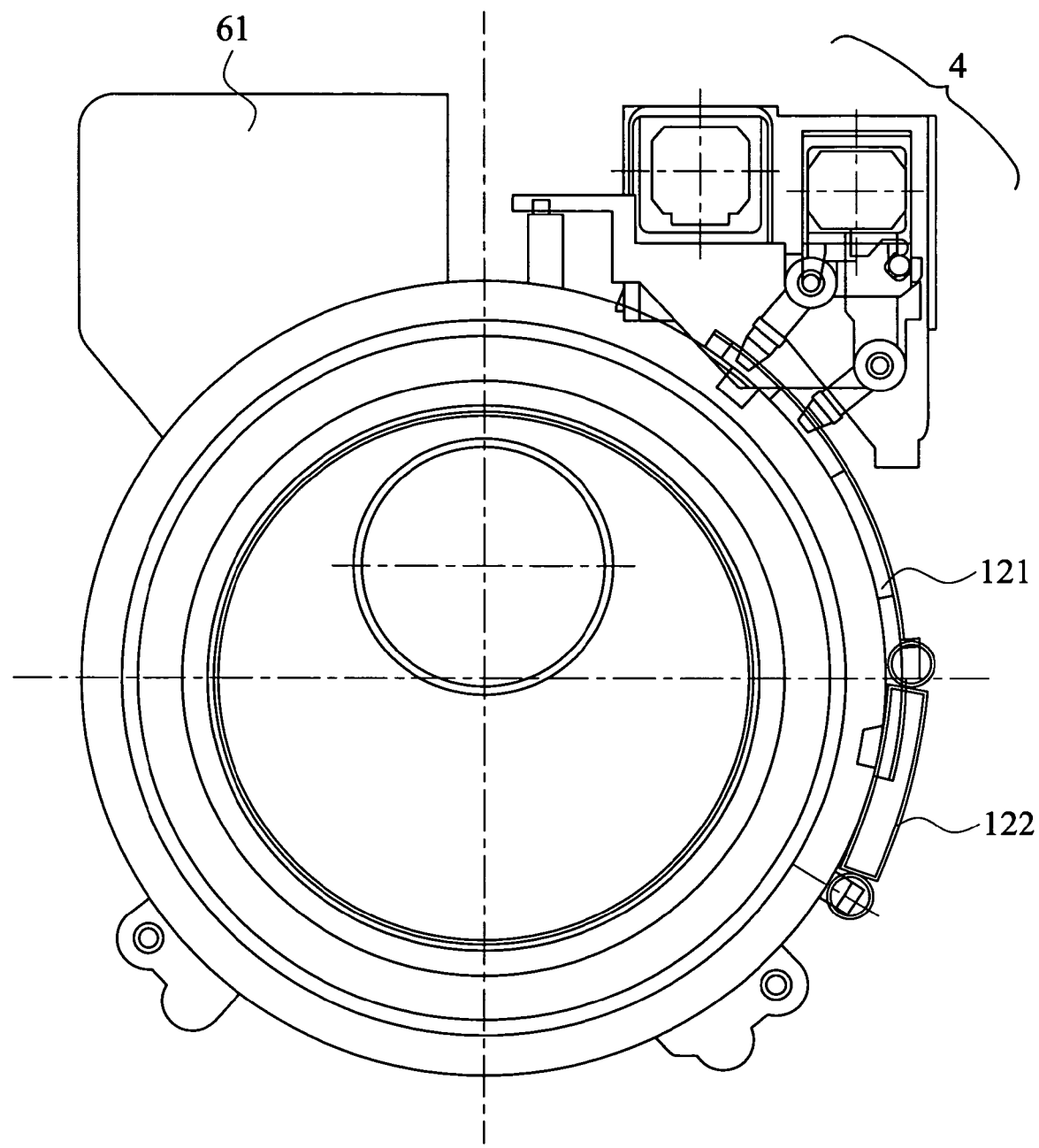
FIG. 24 is a front view of a zoom finder unit.

The finder cam barrel spring 122 is biased for the finder cam barrel 121 in a clockwise direction, as shown in FIG. 24. The motion is stopped when the protrusion 121*a* of the finder cam barrel 121 is abutted at an edge 61*g* of the thou-hole 61*f* of the fixing barrel 61. In the full zoom viewing position of the zoom finder unit 4, the cam-follower 102*a* of the first movable lens 102 is at the position 121(4) of the cam groove of the finder cam barrel 121. The cam-follower 13*a* of the second movable lens 103 is at the position 121(14).

Figure 28:
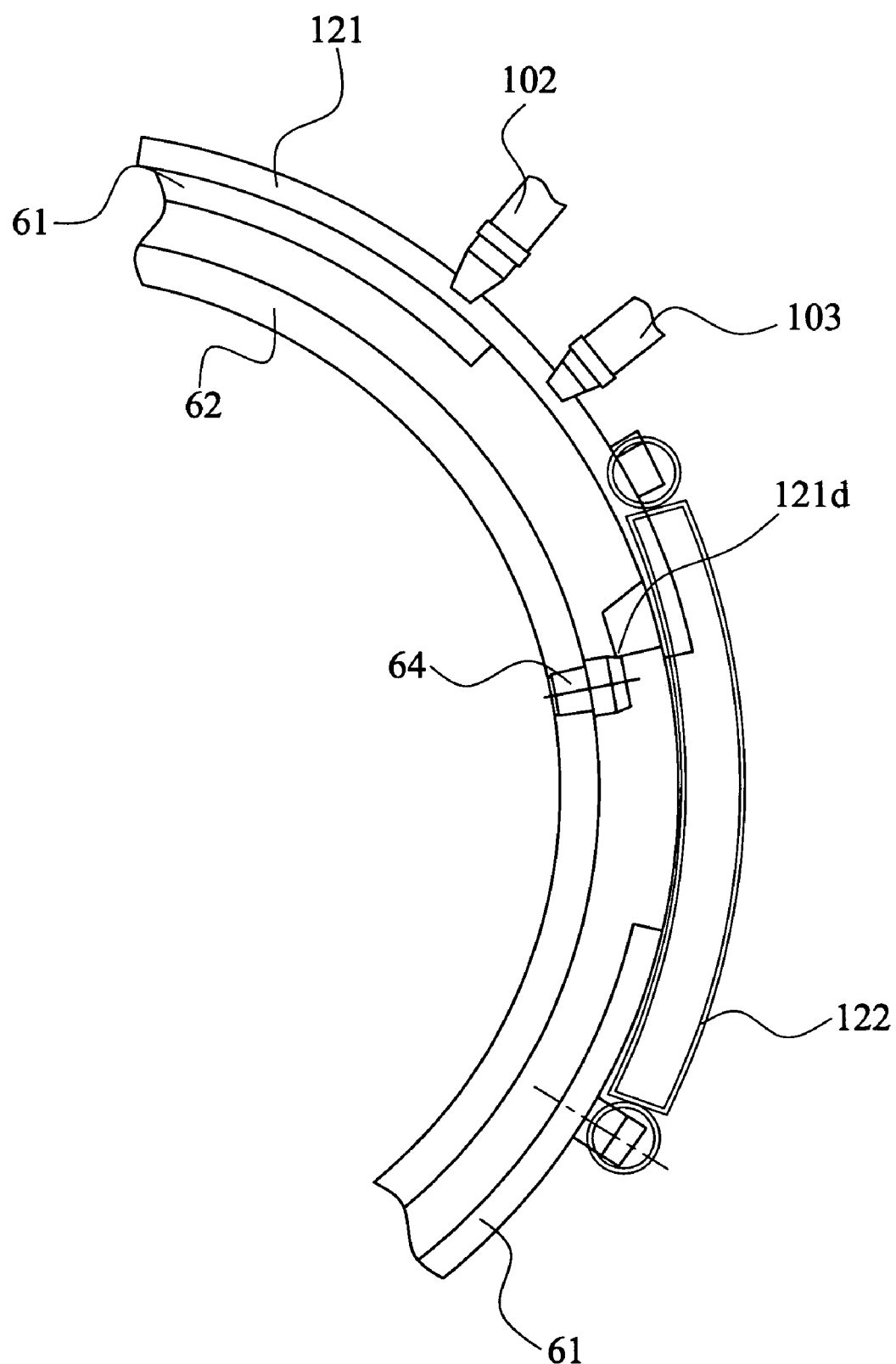
FIG. 28 is a cross section along line A—A of FIG. 26 in a photographing position.
Figure 29:
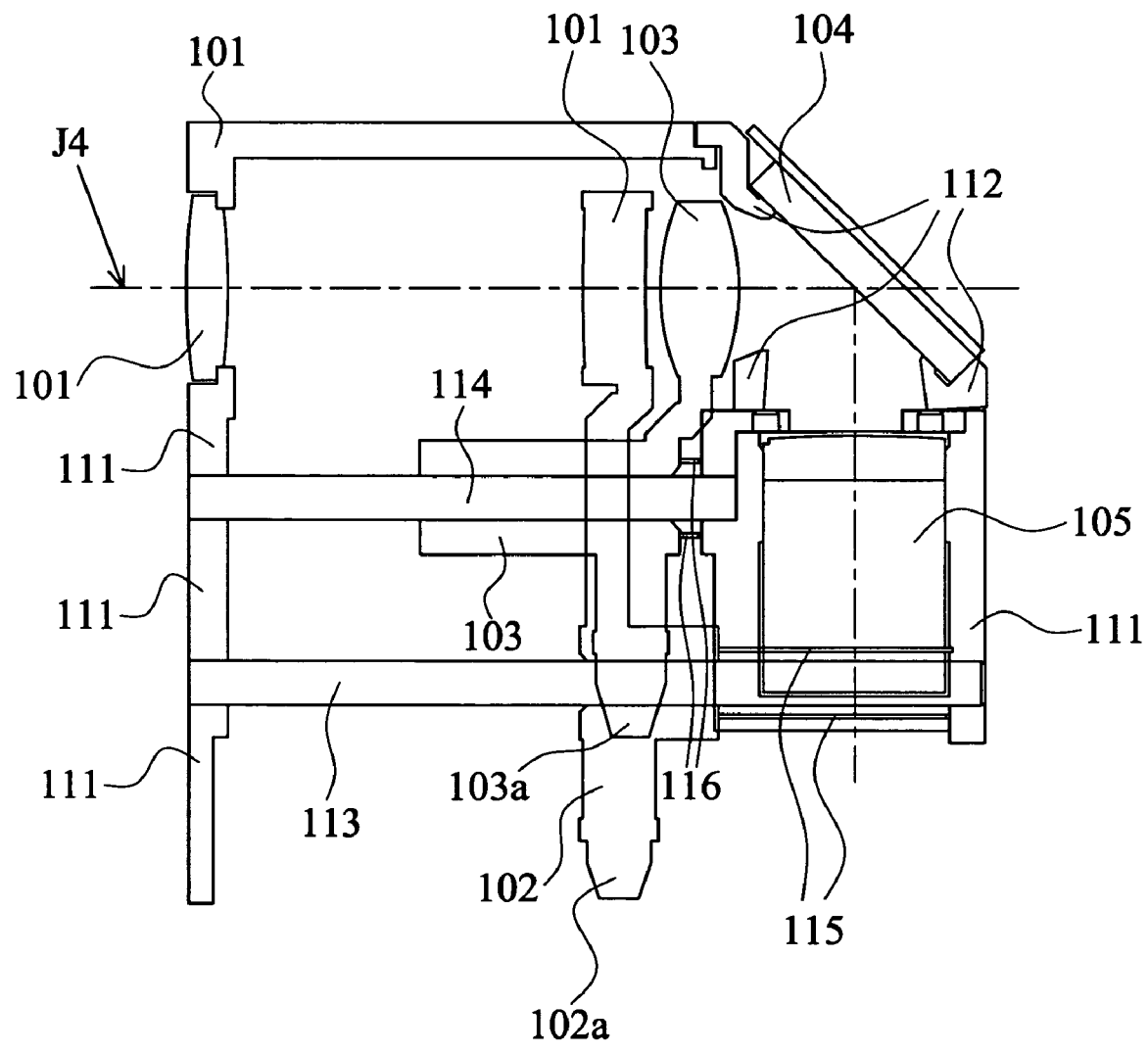
FIG. 29 is a cross section viewed along a finder objective side at a minimum zoom of a viewing position.

The zooming performance of the zoom finder unit 4 is discussed herein. The motion of the lens barrel 2 from the housed position to the full zoom photographing position is mentioned above; however, when the lens barrel 2 is moving, the zoom finder unit 4 is idle. As shown in FIGS. 22 and 27, the zoom finder unit 4 remains at full zoom. When the lens barrel 2 at full zoom, and the cam-follower pin 64 of the rotary barrel 62 reaches the position 61(4) of the cam groove of the fixing barrel 61, the cam-follower pin 64 corresponding to the cam groove disposed in the through-hole 61*f* of the fixing barrel 61 is abutted at a front end 121*d* of the protrusion 121*c* of the finder cam barrel 121. The lens barrel 2 is driven from the full zoom to the minimum zoom of the photographing position. The cam-follower pin 64 is pressed into the front end 121*d* of the finder cam barrel 121 to rotate the finder cam barrel 121. FIG. 28 is a cross section along line A—A of FIG. 26 in a photographing position, when the cam-follower pin of the rotary barrel moving the finder cam barrel 121. The cam-follower 102*a* of the first movable lens 102 is moved from the position 121(4) to the position 121(5) of the cam groove of the finder cam barrel 121. The cam-follower 103*a* of the second movable lens 103 is moved from the position 121(14) to the position 121(15) of the cam groove of the finder cam barrel 121. Two cam grooves of the finder cam barrel 121 correspond to the focal distance of the photographic lens of the lens barrel 2, and the focal distance is variable between the full zoom and the minimum zoom. FIG. 29 is a cross section viewed along a finder objective side at a minimum zoom of a viewing position.

The biasing force of the spring 122 maintains engagement between the front end 121*d* of protrusion of the finder cam barrel 121 and the cam-follower pin 64 of the rotary barrel. When moving from the minimum zoom position to the full zoom position, the focal distance of the lens barrel 2 corresponding to that of the zoom finder unit 4 can be obtained.

According to the above structure, the lens barrel 2 can be in a housed position, and the cam-follower pin 64 of the rotary barrel is not abutted at the front end 121*d* of the finder cam barrel 121 without driving the first and second movable lens 102 and 103. In the zoom region of the lens barrel 2, the cam-follower pin 64 of the rotary barrel is abutted at the front end 121*d* of the finder cam barrel 121 to move the first and second movable lens 102 and 103. Thus, there is no additional loading between the housed position and the photographing position for the finder lens drive. The rotational stroke of the finder cam barrel 121 can be reduced with a greater degree of freedom. Specifically, the rotational angle of the rotary barrel 62 from the housed position to the photographing position is effective in a large-sized lens barrel 2.

Moreover, the rotary barrel cam-follower pin 64 for guiding the rotary barrel 62 with respect to the fixing barrel 61 serves as a driving source, and by rotating the finder cam barrel 121, the first movable lens 102 and the second movable lens 103 are driven. The zoom finder drive mechanism is simplified, reducing costs and minimizing the size thereof.

In this structure, the portion abutted at the front end 121*d* of the finder cam barrel 121 can be designed in the same way as the cam-follower pin 64 and other protrusions on the rotary barrel 62. However, a groove without interfering with the protrusion must be formed on the inner side of the fixing barrel. The strength assurance of the fixing barrel 61 and the arrangement preventing interference between the grooves 61*a* and 61*b* should be considered, which is not appropriate. The structure of the cam follower pin 64 of the rotary barrel abutted at the front end 121*d* of the finder cam barrel 121 is preferable.

The invention is not limited to the above disclosure. There are other variations.

For example, the finder cam barrel 121 of the above embodiment is arc, wing-shaped. A cylindrical-shaped finder cam barrel 121 covering the entire outer circumference of the fixing barrel 61 is also a choice to stabilize the rotation thereof.

Furthermore, the connection between the cam-follower 64 of the rotary barrel and the front end 121d of the finder cam barrel 121 can be maintained in the zoom region from the housed position of the lens barrel 2 to the full zoom photographing position.

Moreover, in the embodiment, the cam-follower engaged with the cam groove of the finder cam barrel 121 is formed directly on the movable lens, serving as a body of the finder lens drive element. Alternatively, the cam-follower can be formed on a holding element of the movable lens as a finder lens drive element.

Moreover, the quantities of the lens of the zoom finder unit 4 driven by the finder am barrel 121 can be at least one or more than three.

The zoom finder drive mechanism can only be driven when taking a picture in the zoom region, providing simplified structure, lowered costs, and minimizing the size thereof. Thus, it is applicable in any camera.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom finder drive mechanism, driven by movement of a zoom lens barrel of an optical photography system, comprising:
    a fixing barrel, comprising:
        at least one first cam groove, formed on an inner circumference thereof and having a bottom surface defined thereon; and
        a hole, formed on an outer circumference thereof and connecting to a part of the first cam groove via the bottom surface of the first cam groove;
    a rotary barrel, comprising at least one first cam-follower formed on an outer circumference thereof and engaged with the first cam groove of the fixing barrel, rotating about a central axis parallel to an optical axis of the optical photography system;
    a finder cam barrel, disposed on the outer circumference of the fixing barrel, comprising a second cam groove formed on an outer circumference thereof, and rotating by contacting the first cam-follower of the rotary barrel via the hole of the fixing barrel; and
    a finder lens drive member, comprising a second cam-follower engaged with the second cam groove so as to drive at least a portion of a finder lens group.

2. The zoom finder drive mechanism as claimed in claim 1, wherein as the optical photography system is collapsed in a collapsed position when no photograph can be taken, the finder cam barrel does not contact the first cam-follower of the rotary barrel, and as the optical photography system is extended from a collapsed position so as to perform a zoom operation, the finder cam barrel contacts the first cam-follower of the rotary barrel via the hole of the fixing barrel.

3. The zoom finder drive mechanism as claimed in claim 2, wherein the finder cam barrel further includes an enable means for contacting the first cam-follower as the rotary barrel rotates in the fixing barrel.

4. The zoom finder drive mechanism as claimed in claim 3, wherein the enable means is a protrusion inserting in the hole of the fixing barrel.

* * * * *